Oct. 31, 1944.　　P. SPURLINO ET AL　　2,361,662
ACCOUNTING MACHINE
Filed Oct. 2, 1940　　12 Sheets-Sheet 1

Pascal Spurlino and
Konrad Rauch
Inventors

By　Earl Beust
Their Attorney

Oct. 31, 1944. P. SPURLINO ET AL 2,361,662
ACCOUNTING MACHINE
Filed Oct. 2, 1940 12 Sheets-Sheet 2

Pascal Spurlino and
Konrad Rauch
Inventors
By Hearl Beust
Their Attorney

Oct. 31, 1944.   P. SPURLINO ET AL   2,361,662
ACCOUNTING MACHINE
Filed Oct. 2, 1940   12 Sheets-Sheet 4

Pascal Spurlino and
Konrad Rauch
Inventors

By Pearl Bennet

Their Attorney

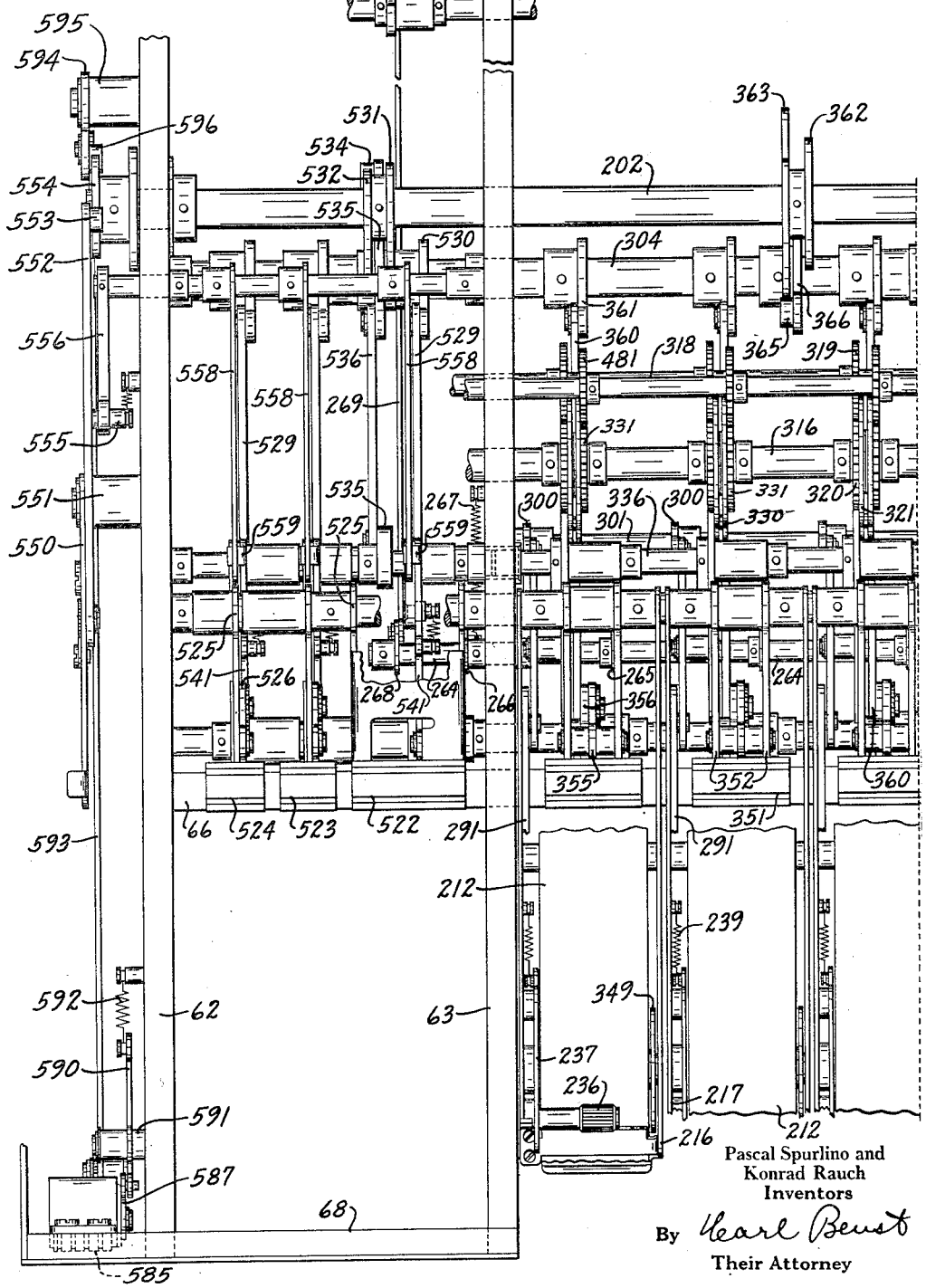

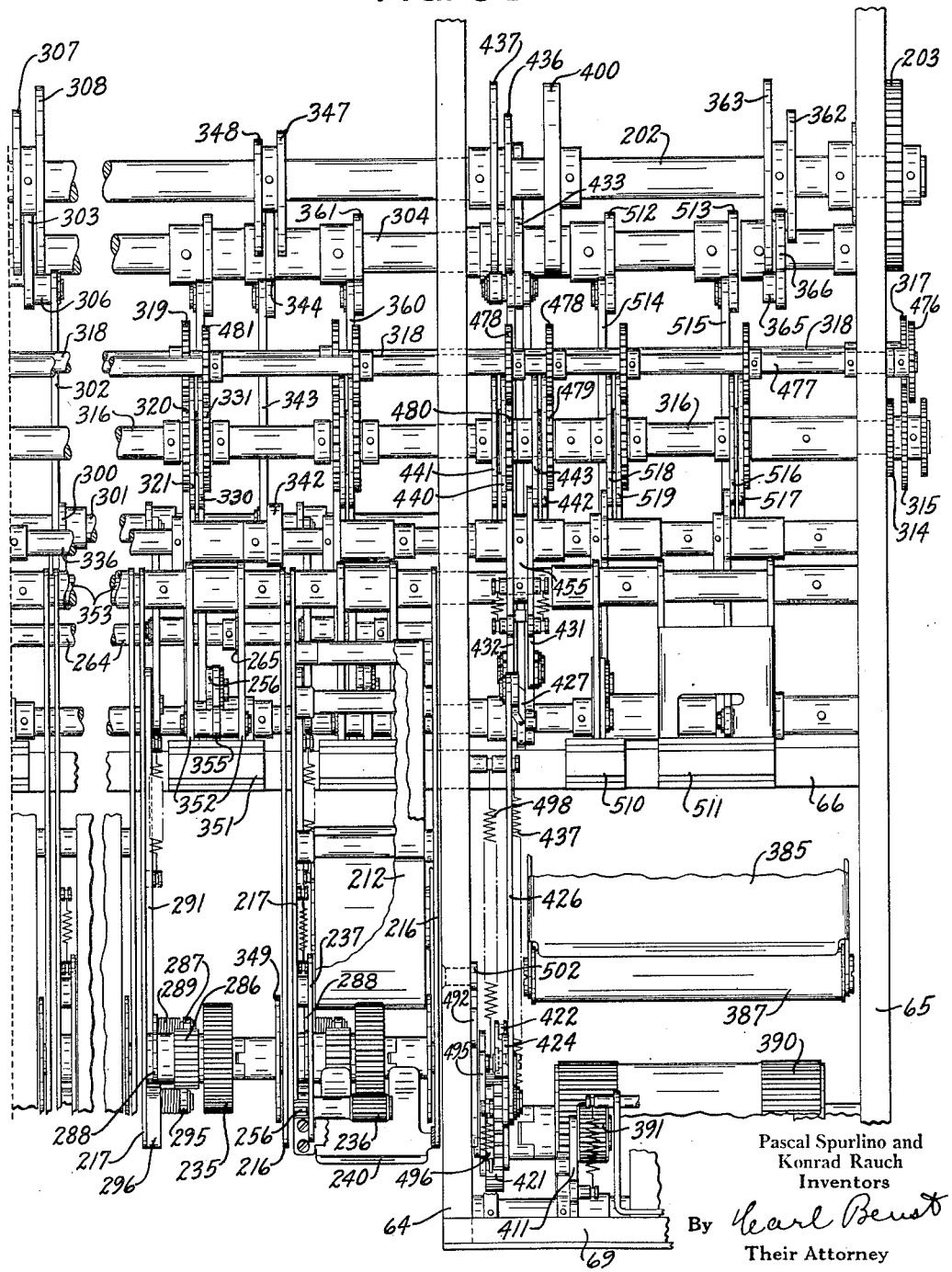

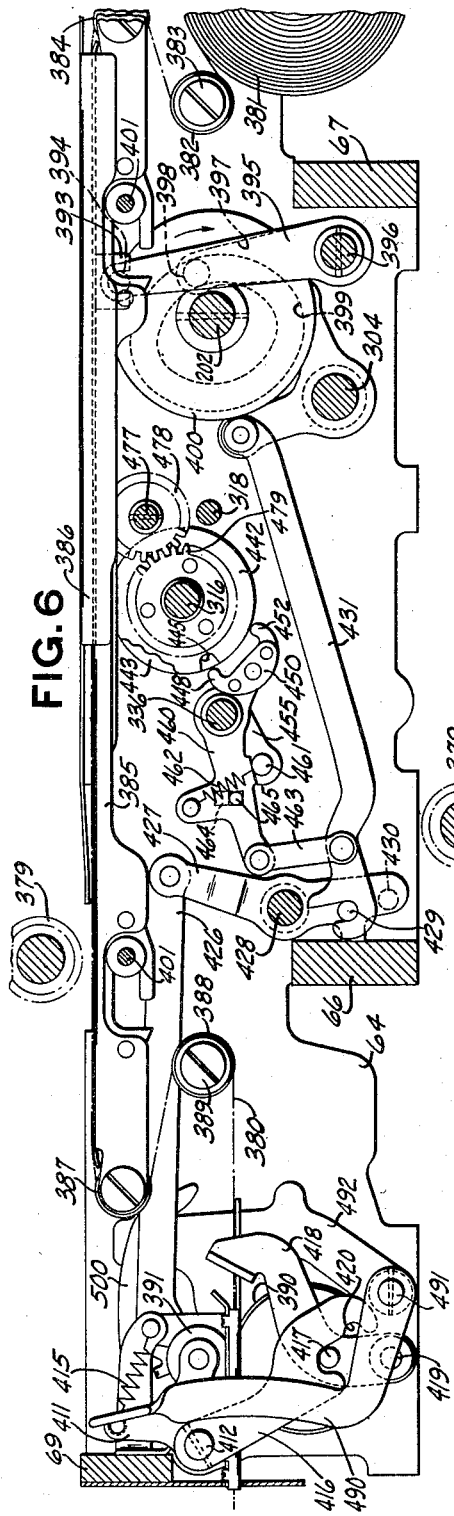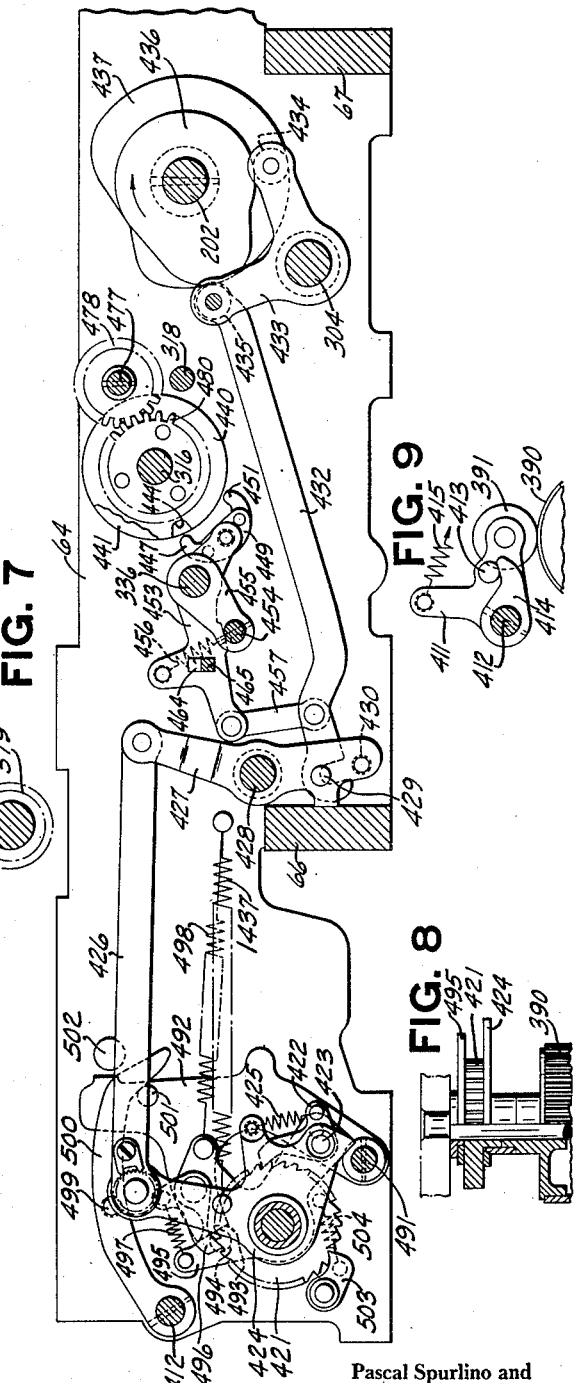

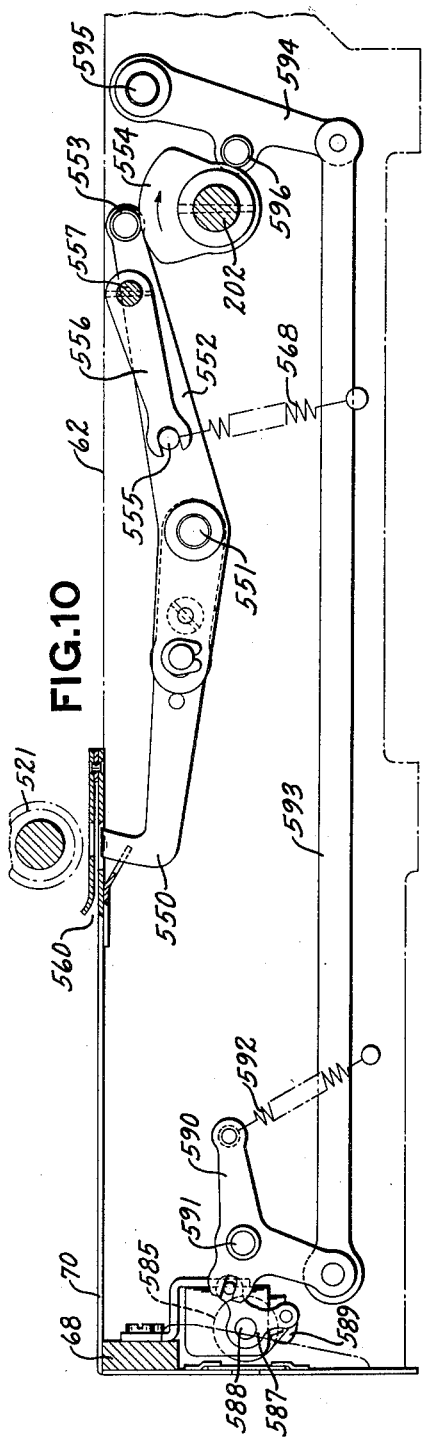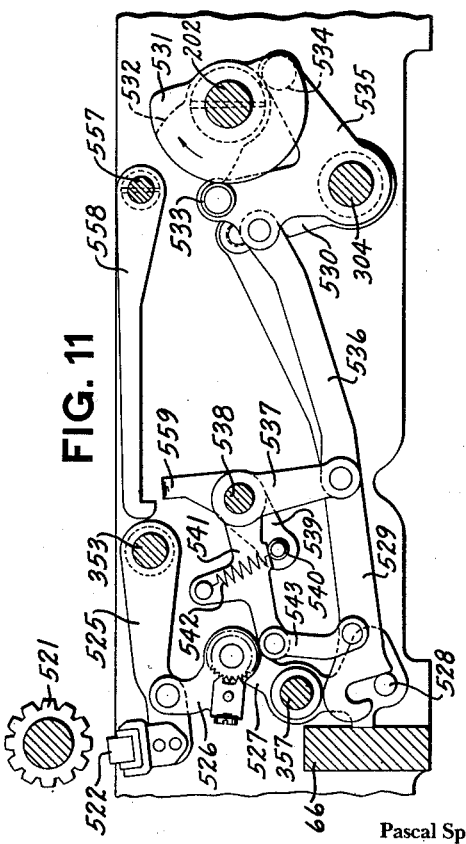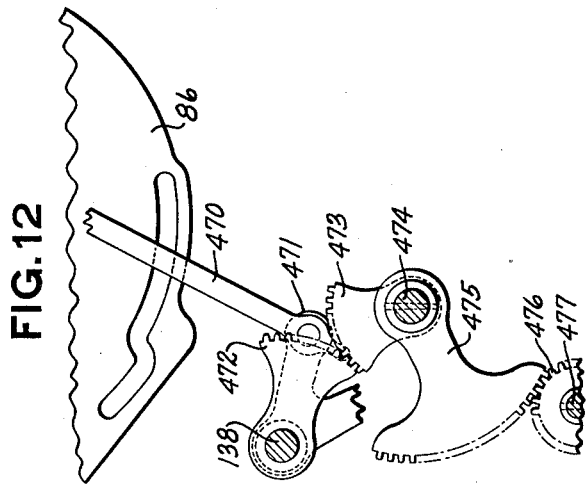

Oct. 31, 1944.　　P. SPURLINO ET AL　　2,361,662
ACCOUNTING MACHINE
Filed Oct. 2, 1940　　12 Sheets-Sheet 9

Pascal Spurlino and
Konrad Rauch
Inventors

By Carl Beust
Their Attorney

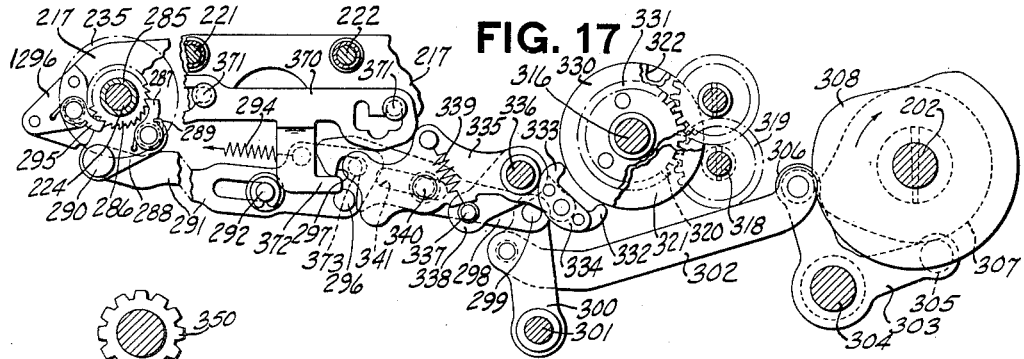
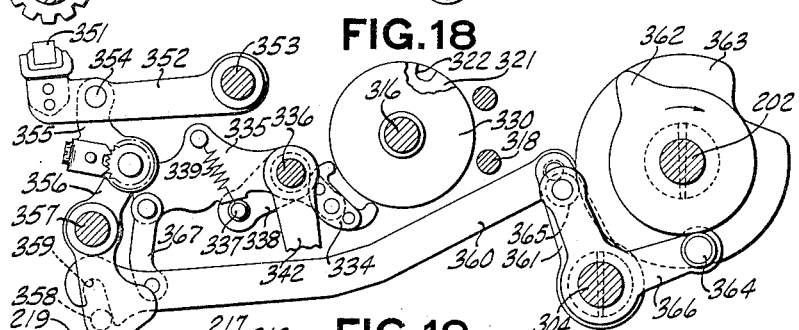
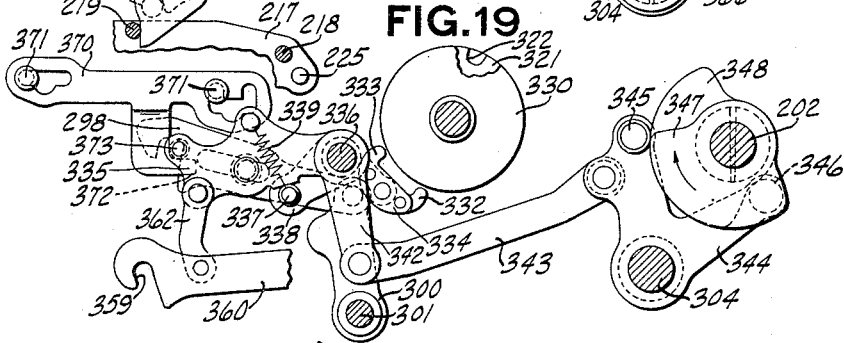
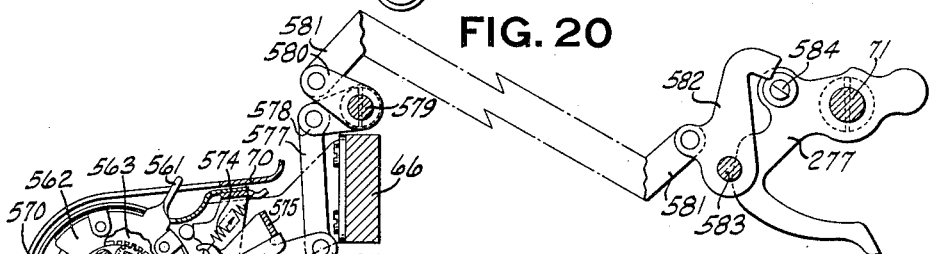
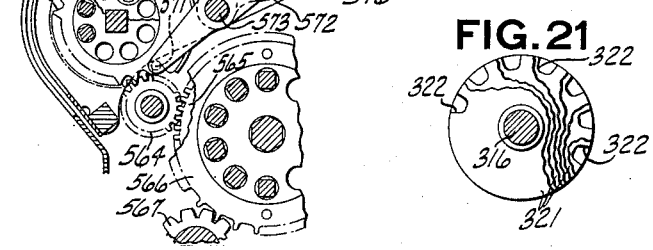

Oct. 31, 1944.   P. SPURLINO ET AL   2,361,662
ACCOUNTING MACHINE
Filed Oct. 2, 1940   12 Sheets-Sheet 11

FIG. 22

| | | |
|---|---|---|
| 1487 | 7 | 73.10 |
| 1487 | 6ᵃ | 38.14 |
| 1487 | ⋈ | 111.24-20 |
| 1486 | 2 | 18.25 |
| 1486 | 9 | 6.50 |
| 1486 | 16 | 10.00 |
| 1486 | 4 | 225.00 |
| 1486 | 13 | 88.14 |
| 1486 | ⋈ | 347.89-20 |
| 1485 | 7 | 19.40 |
| 1485 | 6ᵃ | 8.63 |
| 1485 | 16 | 48.32 |
| 1485 | ⋈ | 76.35-20 |
| 1484 | 17 | 10.00 |
| 1484 | 15 | 61.30 |
| 1484 | 3 | 22.00 |
| 1484 | 10 | 150.60 |
| 1484 | ⋈ | 243.90-20 |
| 1483 | 6ᵃ | 66.67 |
| 1483 | 5 | 15.00 |
| 1483 | 15 | 29.40 |
| 1483 | 18 | 70.60 |
| 1483 | ⋈ | 181.67-20 |
| 1482 | 4 | 1.25 |
| 1482 | 2 | 87.50 |
| 1482 | 1 | 22.00 |
| 1482 | 14 | 18.56 |
| 1482 | 16 | 10.00 |
| 1482 | 8 | 280.00 |
| 1482 | 10 | 100.00 |
| 1482 | ⋈ | 519.31-20 |
| 1481 | 7 | 18.25 |
| 1481 | 6 | 5.22 |
| 1481 | 5 | 14.00 |
| 1481 | 1 | 75.00 |
| 1481 | 11 | 34.56 |
| 1481 | ⋈ | 147.03-20 |

FIRST NATIONAL BANK & TRUST CO.
ANYWHERE, OHIO  April 15 1940
DEPOSITED TO THE CREDIT OF
John Jones + Co.

| CURRENCY | | 100 | — |
|---|---|---|---|
| SILVER | | | |
| CHECKS | | | |
| | | 280 | — |
| | | 10 | — |
| | | 18 | 56 |
| | | 22 | — |
| | | 87 | 50 |
| | | 1 | 25 |
| | | 519 | 31 |

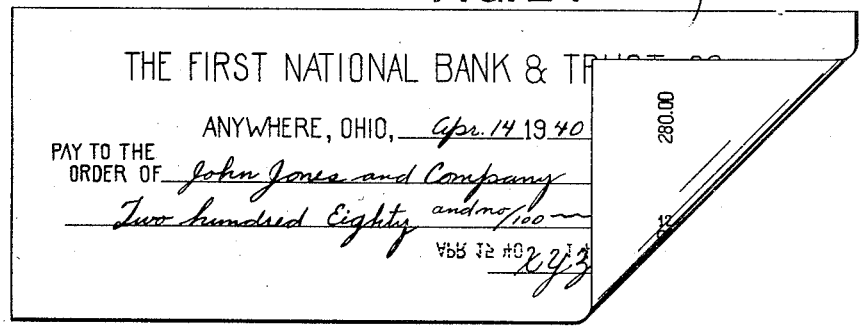

THE FIRST NATIONAL BANK & TRUST CO.
ANYWHERE, OHIO, Apr. 14 1940
PAY TO THE ORDER OF John Jones and Company
Two hundred Eighty and no/100 —

508
280.00

Pascal Spurlino and
Konrad Rauch
Inventors

By Earl Berst
Their Attorney

Oct. 31, 1944.    P. SPURLINO ET AL    2,361,662
ACCOUNTING MACHINE
Filed Oct. 2, 1940    12 Sheets-Sheet 12

FIG.25

PROOF DEPARTMENT BALANCE SHEET

| MACH. NO. DEPT. NO. | AMOUNT | | DESCRIPTION | NO. ITEMS |
|---|---|---|---|---|
| 12  1 | 13,925.63 | * | CLEARING HOUSE BANK NO.1 | |
| 12  2 | 15,717.27 | * | CLEARING HOUSE BANK NO.2 | |
| 12  3 | 1,618.50 | * | CLEARING HOUSE BANK NO.3 | |
| 12  4 | 1,725.97 | * | CLEARING HOUSE BANK NO.4 | |
| 12  5 | 12,468.10 | * | TRANSIT LETTER NO.1 | |
| 12  6 | 10,353.33 | * | TRANSIT LETTER NO.2 | |
| 12  7 | 2,429.40 | * | TRANSIT LETTER NO.3 | |
| 12  8 | 728.30 | * | MISCELLANEOUS TRANSIT | |
| 12  9 | 1,291.50 | * | CASH ITEMS | |
| 12 10 | 6,056.10 | * | CASH TELLER NO.1 | |
| 12 11 | 5,348.93 | * | CASH TELLER NO.2 | |
| 12 12 | 6,151.25 | * | CASH TELLER NO.3 | |
| 12 13 | 5,943.72 | * | CASH TELLER NO.4 | |
| 12 14 | 17,761.91 | * | INDIVIDUAL LEDGER A - G | |
| 12 15 | 16,679.19 | * | INDIVIDUAL LEDGER H - O | |
| 12 16 | 17,844.63 | * | INDIVIDUAL LEDGER P - Z | |
| 12 17 | 2,100.00 | * | GENERAL LEDGER DEBITS | |
| 12 18 | 70.60 | * | MONEY ORDERS | |
| 12 | 4,652.23-19* | | MISCELLANEOUS CREDITS | |
| 12 | 133,562.10-20* | | DEPOSITS | |

TOTAL DEBITS _____    TOTAL CREDITS _____    TOTAL ITEMS _____

| DATE | LAST DEPOSIT NO. | DEPT NO. | MACH. NO. | AMOUNT |
|---|---|---|---|---|
| APR 15 40 | 1489 | 8 | 12 | 728.30S |

DEPARTMENTAL TOTAL READING

DEPARTMENT _Misc. Transit_

NO. ITEMS _365_

509

Pascal Spurlino and
Konrad Rauch
Inventors

By *Carl Beust*
Their Attorney

Patented Oct. 31, 1944

2,361,662

UNITED STATES PATENT OFFICE 2,361,662

ACCOUNTING MACHINE

Pascal Spurlino and Konrad Rauch, Dayton, Ohio, assignors to The National Cash Register Company, Dayton, Ohio, a corporation of Maryland Application October 2, 1940, Serial No. 359,374

8 Claims. (Cl. 101—96)

This invention relates to accounting machines and similar business machines and is directed particularly to the recording means of such types of machines.

The invention is embodied in machines of the general type shown in the following United States Letters Patent, and reference may be had to them for a complete showing and description of standard mechanisms not fully disclosed herein: United States patents, Nos. 1,619,796; 1,747,397; and 1,761,542, issued March 1, 1927; February 18, 1930; and June 3, 1930, respectively, to Bernis M. Shipley; No. 2,175,346, issued October 10, 1939, to Maximilian M. Goldberg; No. 2,141,332, issued December 27, 1938, to Charles H. Arnold; and No. 1,693,279, issued November 27, 1928, to Walter J. Kreider.

The machine embodying the present invention, and as now constructed, is well adapted for use by banks and especially in the proof department thereof, where the various items are listed and distributed and deposits checked for a proof balance at the end of each day.

Each bank, in its proof department, keeps an accurate record of each transaction handled by the bank, which tranactions generally come from incoming mail, from out-of-town or transit banks, incoming clearings from local banks, and receiving and paying items handled by the tellers of the bank.

Many banks require their list of checks or items paid by another bank to be accompanied by a printed list of checks paid by a bank when these checks are sent back to the bank on which they are drawn.

Therefore, for use in connection with these and other requirements of the bank, a machine which prints individual lists of groups of items, a master list of all items, identification data on deposit slips or on a check as desired, a departmental or group total slip, and totals of the distributed items is essential, as it not only is a great time saver for the employees of the bank, but also provides accurate machine-printed results immediately at the close of the day's business.

For the purpose of illustrating one form of the present invention, the machine shown herein is constructed to perform the functions stated above. However, it is not intended to limit the invention to this one form, as other forms for fulfilling other business systems may be used without in any way departing from the invention.

It is, therefore, one object of this invention to provide an accounting machine with means for distributing items into a plurality of classifications and also provide a plurality of individual listing tapes or detail strips for recording the items of such classifications.

Another object is to provide means for selecting one of said tapes to receive a printed record of an item, said selection being controlled by the selection of the classification totalizer which receives said item.

A further object is the provision of removable frames for the individual tapes, one frame for each tape, which frame may be easily removed to replace the paper roll therein whenever necessary.

Another object is to provide positive means to prevent operation of the machine unless all of said individual frames are properly located or latched in operating position in the machine.

Another object is to provide a separate feeding means for each tape, a common driver for all, and a selecting means to determine which of said feeding means shall be actuated by said common driver.

Another object is to provide a master tape or record strip to receive printed impressions of all items listed on all of said individual tapes, and on which are also listed all other classifications of items which, due to the particular system of the bank, are not listed on any of the individual tapes.

Another object is to provide a variable feed for said master tape, controlled by the type of operation of the machine.

A further object is to provide additional printing means to certify checks and/or deposit slips.

Another object is the provision of a device to sort checks when they are listed, which device is associated with a machine that has thereon means controlled by the individual tape selector control to indicate the proper section of the device to receive the checks.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Figs. 5A and 5B taken together constitute a plan view of the mechanism for operating the individual listing tape printing means, the master tape or audit strip printing means, and the slip printing means.

Fig. 6 shows the means for giving the master tape a long feed when totals are printed by the machine and also shows a manual feed and the tension release lever for the master tape.

Fig. 7 shows the master tape short feed means and the control for the same.

Fig. 8 is a detail view, partly in section, showing the construction of a portion of the feed means for the master tape.

Fig. 9 is a detail view of the master tape tension roll.

Fig. 10 shows the visible consecutive numbering means and the slip feeler device.

Fig. 11 shows the slip impression means and a part of the control therefor.

Fig. 12 is a fragmentary side view of the total control plate and the connection therefrom to the master tape feed control.

Figure 13:
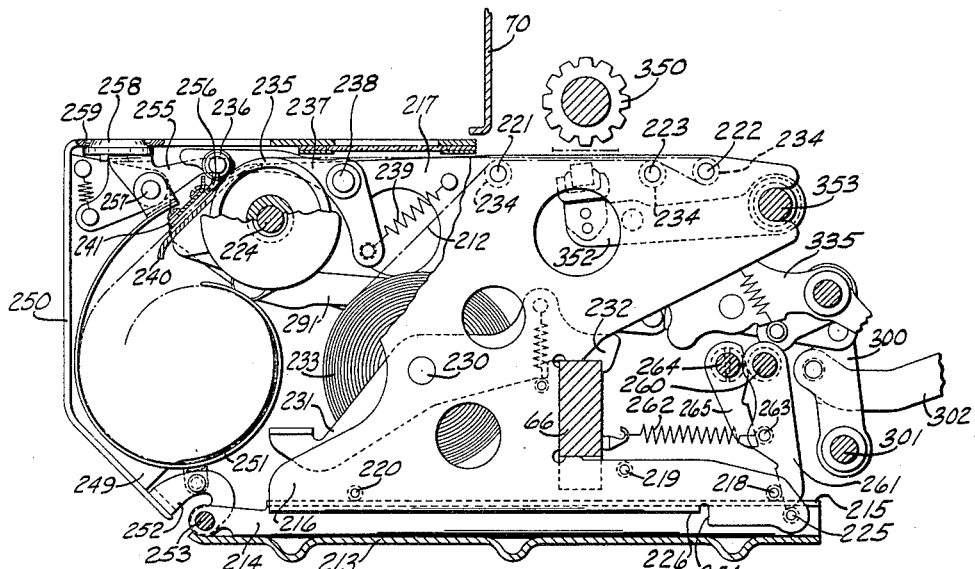

Fig. 13 shows a portion of the impression means and one of the removable carrying frames for the listing tape and the interlocking means which prevents operation of the machine unless the frame is locked in proper position in the machine.

Figure 14:
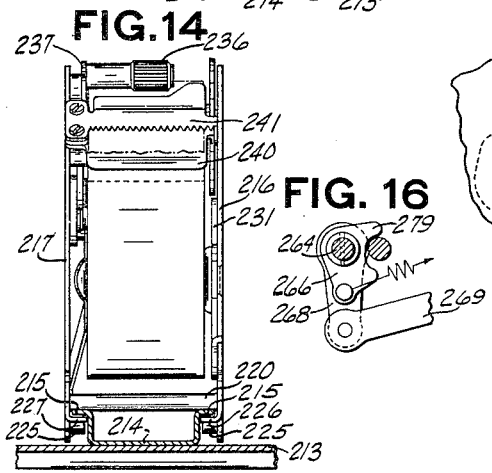

Fig. 14 is a front view of one of the removable carrying frames for listing tape.

Figure 15:
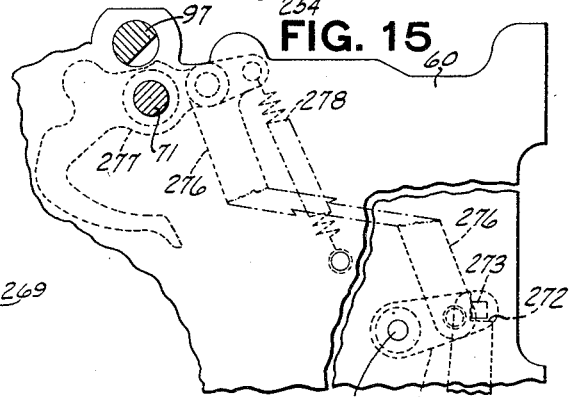

Fig. 15 shows a portion of one of said frames, part of the machine releasing means, and the interlocking mechanism to prevent release of the machine unless said frame is locked in proper position in the machine, this view showing the frame partly withdrawn, whereby the interlocking means is in position to prevent operation of the machine release means.

Figure 16:
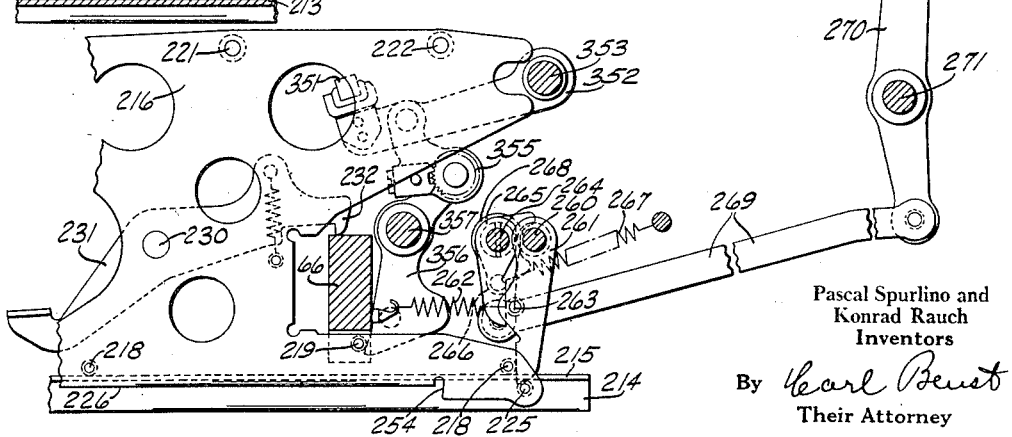

Fig. 16 is a detail view of a part of said interlocking means.

Fig. 17 shows the listing tape feeding means and the control therefor.

Fig. 18 shows the listing tape impression means and the operating means therefor.

Fig. 19 shows the listing tape impression control means.

Fig. 20 shows the date setting means and the interlocks between the same and the machine releasing means.

Fig. 21 is a view showing the seven impression control disks, one for each of the listing tapes, controlled by the second transaction bank of keys.

Fig. 22 shows a portion of a master tape or audit strip.

Fig. 23 shows a deposit slip.

Fig. 24 shows a bank check.

Figures 25, 26, 27, 28:
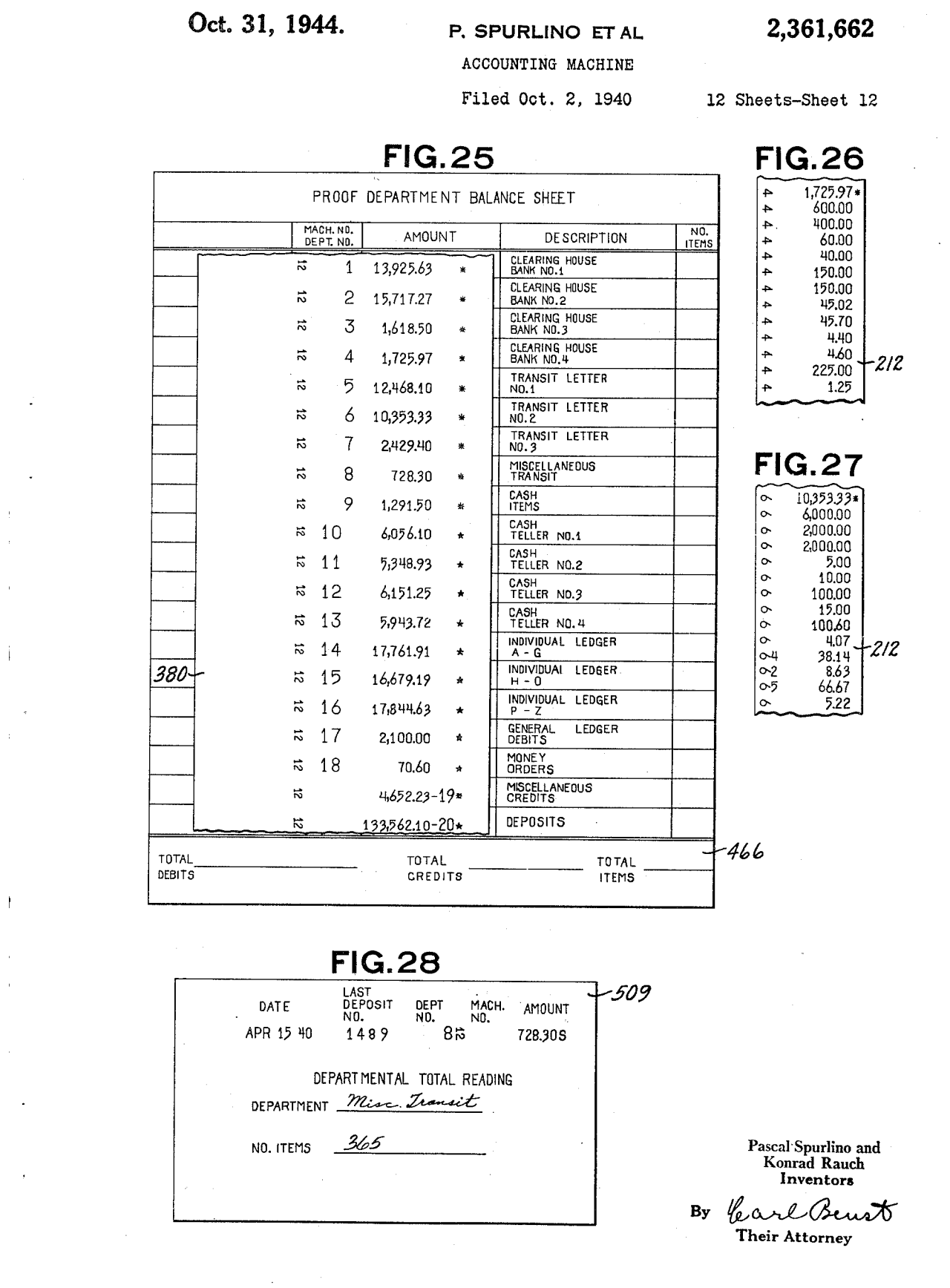

Fig. 25 shows a portion of a master tape and how it is used on the proof of balance sheet.

Fig. 26 shows a portion of one of the listing tapes.

Fig. 27 shows a portion of another of the listing tapes.

Fig. 28 shows a departmental total slip.

GENERAL DESCRIPTION

Described in general terms, the machine embodying the instant invention is of the type generally disclosed in the above-mentioned Shipley and Goldberg patents. These patents disclose a plurality of totalizers into which may be distributed various amounts, according to the business system for which the machine is built. In the present instance, the totalizers are adapted to receive the many and various items constituting individual transactions that are handled in the ordinary banking business. Those patents also disclose what are known in the art as "add and subtract totalizers" or "crossfooters," from which balances may be printed at any time desired.

In the present machine, there has been a definite change in the position of the master tape or audit strip. In the patents above mentioned, the audit strip is usually in the front of the machine, whereas in the present machine this master tape or audit strip is at the right end of the machine and located under the control banks of keys. Likewise, the slip-printing device, instead of being across the front of the machine, is located at the left of the machine underneath the date-setting mechanism and the date-printing devices. There is provided in the machine of the present invention an internal gear driving mechanism, such as that disclosed in the above-mentioned Kreider patent, which is for the purpose of simultaneously setting up, on groups of printing devices, amounts and data under control of the keys, so that printing can be readily accomplished on an inserted slip or check at the extreme left of the machine, and at the same time these amounts may be set up on the printing wheels associated with seven individual listing tape devices arranged at the front of the machine, whereby any particular one of the devices selected may have printed on its tape the amount which is being entered in the machine as a transaction.

By means of this same type of mechanism shown and described in the Kreider patent, the type wheels are simultaneously set up at the right-hand side of the machine, for the purpose of printing on the master tape or audit strip all of the items entered in the machine.

The above-mentioned column-printing mechanism is controlled by the usual type of differential mechanism shown in the above-mentioned Shipley and Goldberg patents and also shown generally in this application.

As has been previously stated, certain out-of-town banks and also certain local banks require, with checks paid out by the bank having one of the machines of this invention in its proof department, a printed list made for each of said banks, showing the amount of each of the checks which have been paid by the bank, which checks are drawn on said other local banks or out-of-town banks.

Therefore, to provide for such individual item lists, the present invention is provided with seven individual tapes or detail strips with removable frames for carrying those strips, so that the frames can be readily taken out of the machine to have the paper replaced whenever necessary.

The machine keyboard is arranged for taking care of all business in connection with the bank, whereby all transactions handled by the bank may be listed in this machine and a printed record made of each of these transactions. The machine is, therefore, provided with the usual banks of amount keys of sufficient capacity to take care of the ordinary business of any bank.

There are also three rows of what are known in the art as "control keys," for the purpose of selecting various totalizers for the distribution of the transactions entered in the machine. There is also a row of total-taking control keys, which control the machine for the purpose of taking totals from the various totalizers at the close of day when it is desired to clear out the machine to render it ready for business the following morning.

For illustrative purposes, the keys of the second control bank (row 2, Fig. 2) are designated for the purpose of entering the debits from various local banks and transit banks, the first seven keys being used for this purpose. Associated with each one of these keys is one of the removable individual listing tapes above referred to. There is mechanism in the machine under control of these seven keys, which selects the proper one of the individual tapes to receive a printed impression of the amount of the item being entered in the machine. Prior to entering these debits, the total amount of the entire block or debit is first entered in the crossfooter by the depression of the key 20 when the transaction relates to a customer's deposit. This, of course, takes place after the amount of the total has been set up on the keyboard. This total amount goes into the plus side of the crossfooter, and, as each of the various debits is entered in the machine, which debits may be distributed into any one or all seven of the totalizers associated with the first seven keys in the middle control row, these individual amounts are subtracted from the cross footer, so that at the end of the entry of the several items of this particular batch the crossfooter should be clear, which, of course, is a proof that the items were properly totaled.

These items may come from the teller's cage and usually are the deposits made by customers having checking accounts in the bank.

At the same time that the deposit of a customer is run through this bank proof machine, the deposit slip, upon which is listed all of the deposits as they are made by the customer, is placed in the left-hand side of the machine, and the total amount is certified on this deposit slip by printing on the back thereof the date, the consecutive number of the transaction, and a number designating the total into which it was placed in the machine.

Also, when a person comes into the bank to cash a check, the check may be placed in the machine and a verifying amount put on the back of the check by the machine.

There is also associated with this machine a sorting device consisting of boxes or compartments into which the checks are placed by the operator after they have been listed in the machine. Such a sorting device is shown partially in Fig. 1. Each of the bins or sections into which the checks are to be placed after they have been listed carries in the present instance an electrically-lighted indicator, which lights up upon the depression of one of the control keys, to indicate to the operator the bin into which the check is to be placed.

DETAILED DESCRIPTION

Framework and operating mechanism

The machine framework for the main part of the machine comprises a left frame 60 (Figs. 3 and 4) and a right frame (not shown), which support most of the machine mechanism and which are in turn secured to a base 61 and are further supported in relation to each other by various cross frames, rods, and bars. The base 61 rests on and is secured to four printer frames 62 to 65 (Figs. 3 to 7). These printer frames are held in proper relationship to each other by a front tie bar 66 and a rear tie bar 67. The frames 62 and 63 are also tied together at their front ends by a bar 68, and the frames 64 and 65 are tied together at their front ends by a bar 69. All four printer frames rest on the surface of a sub-base (not shown).

The machine proper and also the printing mechanism thereof is enclosed in a suitable cabinet 70 having the necessary hinged openings for access to certain parts of the machine by the operator whenever necessary. All hinged openings are provided with suitable locks to prevent unauthorized persons from having access to the inner part of the machine.

Normally the machine is electrically operated by a conventional type of motor, such as that disclosed in the Shipley patents referred to hereinbefore, and, in addition, a hand crank is provided for operating the machine manually when necessary. The well-known motor starting bar used on previous machines has been omitted from this machine, and, instead, the machine is released for operation by depression of any one of a plurality of so-called "motorized" or "operating" keys located in the total control row and also in the first, second, and third transaction banks. These keys and their use will be explained more in detail later in this specification.

Depression of any of the "operating" keys releases a key lock shaft 71 (Figs. 3, 4, and 15) to the action of a spring (not shown), which rocks said shaft a slight distance clockwise to operate the clutch mechanism which connects the driving motor to a main shaft 72 journaled in the left side frame 60 and the right side frame (not shown). The movement of this shaft 71 simultaneously operates the switch mechanism which closes the circuit to the motor, thus causing the motor to operate.

After the machine has performed the proper number of cycles to complete the type of operation being executed, the key lock shaft 71 is returned counter-clockwise to disengage the clutch mechanism and simultaneously to open the switch to the electric motor. When the machine is manually operated by the use of the hand crank, the operating keys are used for releasing the machine in exactly the same manner as when said machine is electrically operated.

Keyboard

Figure 1:
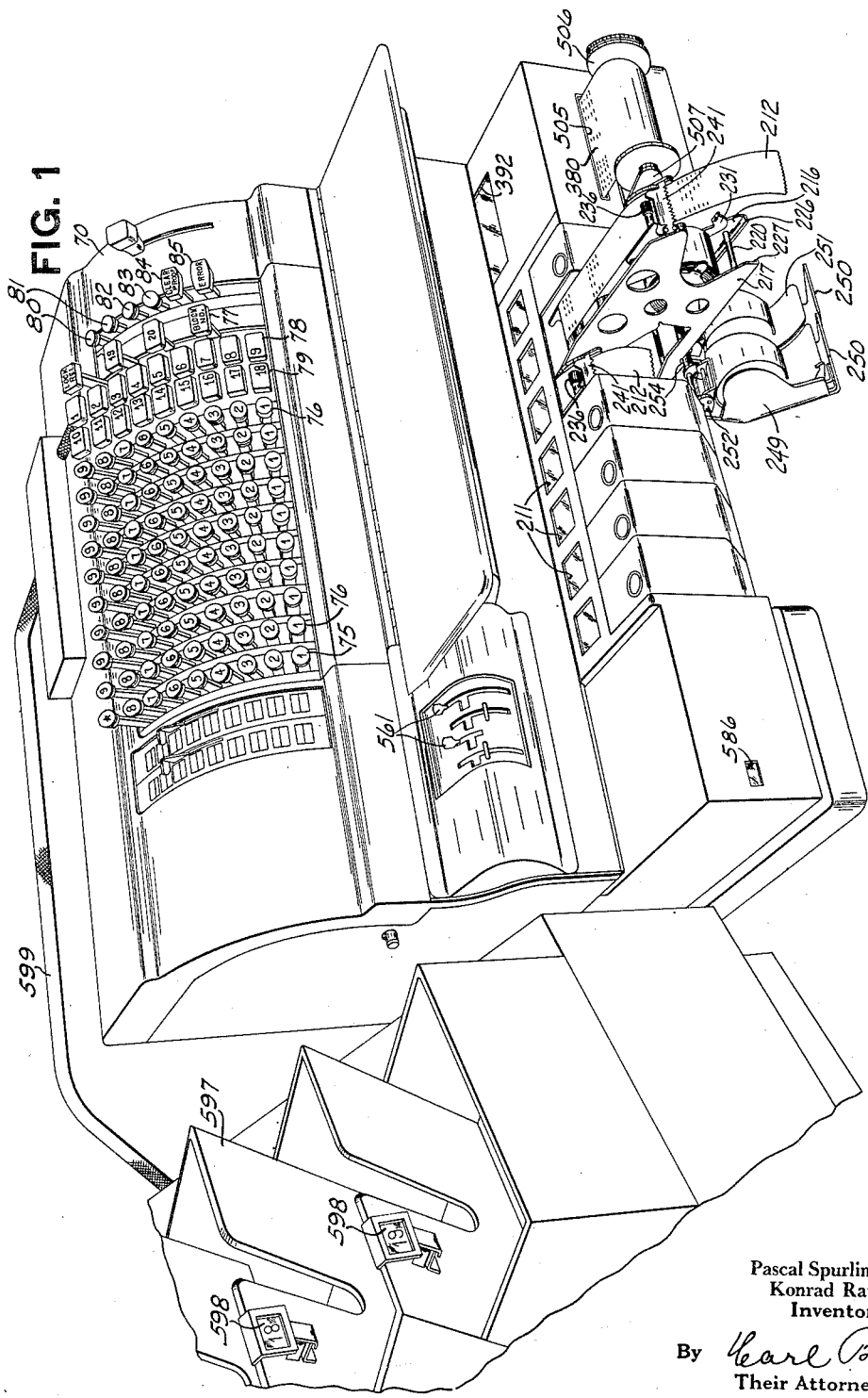
Fig. 1 is a perspective view of the machine embodying the invention and shows a portion of the check-sorting boxes associated therewith.
Figure 2:
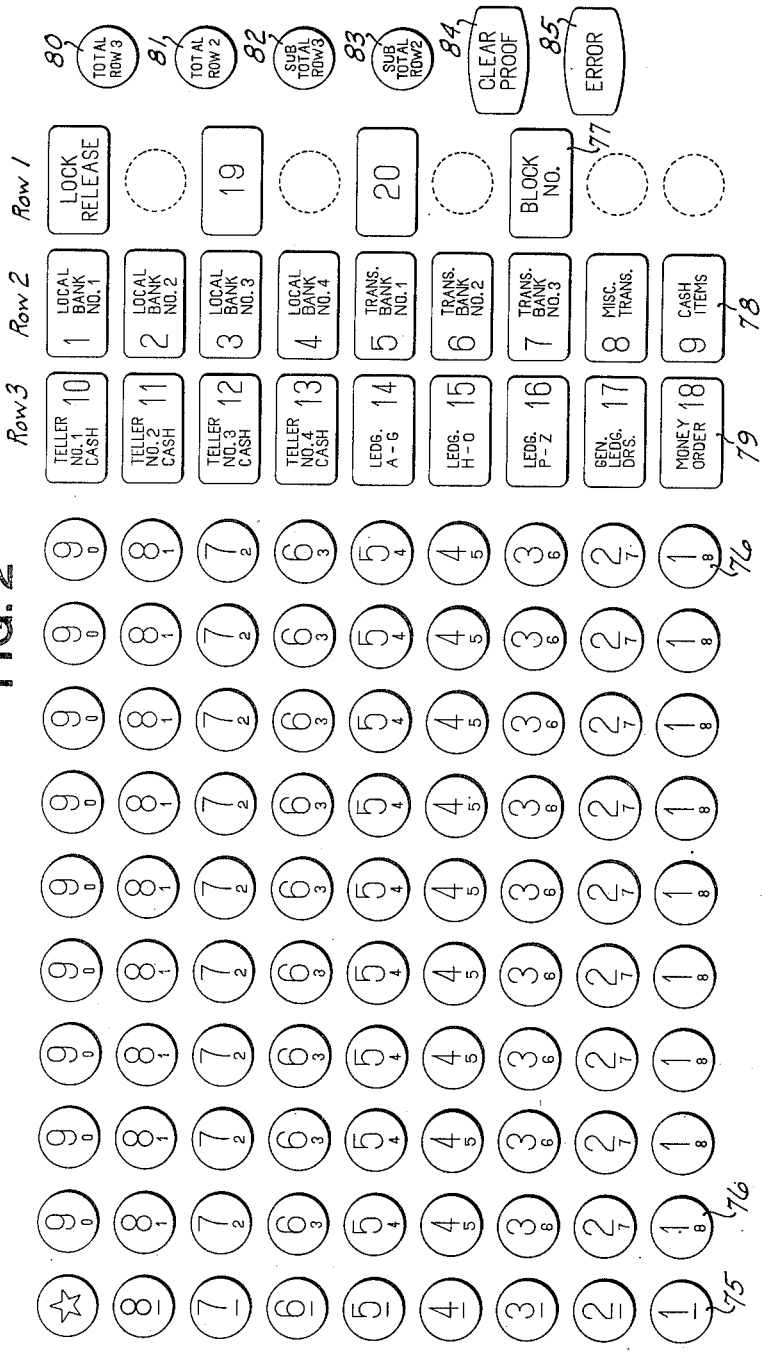
Fig. 2 is a diagrammatic view of the keyboard of the machine.

The keyboard of the machine is shown in perspective in Fig. 1 and in diagrammatic form in Fig. 2. By referring to these two figures, it will be noticed that at the extreme left there is a row of keys 75, which may be used to control the printing of any desirable special designations in connection with any item entered in the machine. There are nine rows of amount keys 76, each key having thereon two numbers complementary to each other. The small numbers are the complementary numbers and are used in setting up complements to correct errors when the operator makes a mistake in setting up the amount or when a depositor has added incorrectly on his deposit slip. There are three banks or rows of transaction keys 77, 78, and 79.

When a customer's deposit is to be entered and distributed by the machine, the total of the deposit is set up on the amount keys 76 and the key "20" in row one is depressed and the machine is put through one operation, wherein the total of the deposit is entered in the crossfooter and also in a group totalizer, which is located in the tenth position in row three.

A distribution of the various items making up the total of the deposit just entered is then made, the operator setting up the amount of each check and distributing these amounts in any of the proper totalizers related to the eighteen transaction keys in rows two and three. The transaction keys 1 to 7 in row two also control the selection of special individual listing tapes, which will be hereinafter described, whereupon the amount of the checks as they are distributed is printed upon these individual tapes.

The row of keys at the extreme right is known as the "total control row," and this row has six keys 80 to 85 inclusive. The first four keys, 80 to 83 inclusive, are used to control the machine for taking totals and sub-totals from the totalizers associated with the keys in rows two and three. The key 84 is used to clear the crossfooter, and the key 85 sub-totals the crossfooter to print the amount of an error on the master tape and shows whether or not this error is a plus error or a minus error. The present machine has a total control plate 86 (Fig. 12) for controlling the engaging and disengaging movements of the three totalizer lines in adding, non-adding, subtracting, total-printing, and sub-total printing operations. The positioning of the total control plate 86 is controlled by the total keys 80 to 85 inclusive.

The present machine has three lines of totalizers including two lines of adding totalizers and, on the third line, an add-subtract or balance totalizer, known in the art as a "crossfooter." The adding totalizers on the various lines and the cross footer are selected for engagement with the actuators by means of the keys in rows 1, 2, and 3 (Fig. 2).

The manner in which the transaction keys 77, 78, and 79 control the selection of the different totalizers, and the manner in which the keys 80 to 85 and the plate 86 control the engaging and disengaging movement of the different totalizer lines, are fully explained in the Shipley patents previously referred to and also in the copending application of Shipley et al., Serial No. 677,980, filed June 28, 1933, which issued as United States Patent No. 2,262,258 on November 11, 1941. As this mechanism has no direct bearing upon the present invention, it is believed that the general description given above will be sufficient.

*Amount banks and their associated differential mechanisms*

As previously stated, the machine of this invention has nine rows of amount keys, and, as all the rows or banks of keys and their associated differential mechanisms are similar in every respect, it is believed that a description of one of these rows of keys and its differential mechanism will be sufficient.

Figure 3:
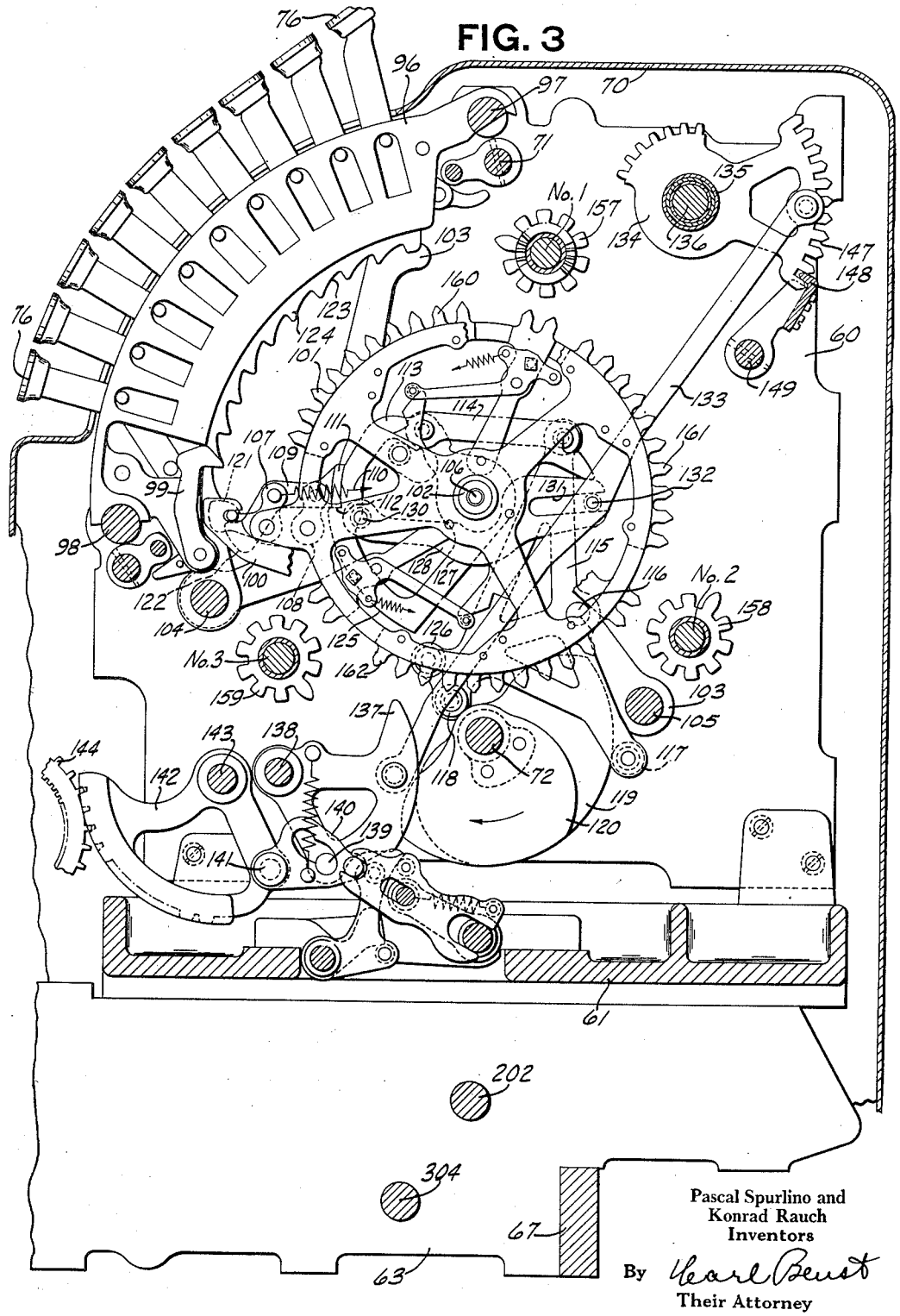
Fig. 3 is a sectional view of the machine taken to the right of one of the amount banks and shows said bank and the differential mechanism associated therewith.

Fig. 3 is a transverse sectional view of the machine taken just to the right of one of the amount banks, showing said bank and its associated differential mechanism, which will be considered as representative of all of the amount banks.

The amount keys 76 are mounted in a key bank framework 96 supported by rods 97 and 98 extending between the main frames of the machine. Depression of one of the keys 76 rocks a zero stop pawl 99 for this particular denomination counter-clockwise out of the path of a reset spider 100 free on a hub of an amount differential actuator 101 rotatably supported by a hub 102 extending between two similar amount differential support plates 103 (only one here shown) in turn supported by rods 104 and 105 extending between the main machine frames.

There is a pair of the support plates 103 for each amount differential, and a tie rod 106 extends through holes in the center of the hubs 102 to secure all of the amount differentials in a compact unit.

A slot in the forward end of the spider 100 (Fig. 3) engages a stud in a latch-disengaging arm 107 pivoted on an extension of the actuator 101. The arm 107 and a companion arm 108 together support a differential latch 109 for radial shifting movement. A spring 110 urges the arms 107 and 108 and the latch 109 rearwardly to normally hold a foot-shaped projection 111 of said latch in engagement with a shoulder 112 on a differential driving segment 113 rotatably supported on the hub of the actuator 101. A link 114 pivotally connects the driving segment 113 to a lever 115 pivoted on a stud 116 in the left-hand one of the plates 103, and said lever 115 carries rollers 117 and 118, which cooperate, respectively, with the peripheries of companion plate cams 119 and 120 secured on the main drive shaft 72. Depression of one of the amount keys 76 likewise moves the lower end thereof into the path of a rounded surface 121 of an extension of the arm 107.

In adding operations, the main shaft 72 and the cams 119 and 120 make one clockwise revolution, causing the lever 115 to rock the driving segment 113 first clockwise and then counter-clockwise back to normal position. During its clockwise movement, the segment 113, by means of the shoulder 112, in cooperation with the projection 111 of the latch 109, carries said latch and the amount actuator 101 clockwise in unison therewith until the rounded surface 121 contacts the stem of the depressed amount key 76. This rocks the latch arm 107 and its companion arm 108 counter-clockwise to disengage the projection 111 from the shoulder 112 to interrupt the clockwise movement of the actuator 101 and to position said actuator in proportion to the depressed amount key 76. Disengaging movement of the latch 109 moves a rounded extension 122 thereof into engagement with the corresponding one of a series of locating notches 123 on a plate 124 secured between the rod 106 and an upward extension of the left-hand support plate 103.

After the latch 109 is disengaged from the shoulder 112 of the segment 113, said segment continues its clockwise movement without interruption, causing an arcuate surface 125 thereof, in cooperation with the sole of the foot-shaped projection 111, to lock the extension 122 of the latch 109 in a notch 123 corresponding to the depressed amount key. When the lever 115 and the segment 113 reach the termini of their initial movements clockwise, a roller 126 carried by said lever 115 engages an arcute surface 127 on the under side of an amount beam 128 pivoted at 130 to the actuator 101 and forces an arcuate surface on the upper edge of said beam to contact with the hub of said actuator 101 to position the beam 128 in proportion to the depressed amount key 76. The beam 128 has a slot 131, which engages a stud 132 in a link 133, the upper end of which is pivotally connected to an indicator positioning segment 134 mounted on one of a series of nested tubes 135 supported by a shaft 136 journaled in the side frames of the machine. The lower end of the link 133 is pivotally connected to a segment 137 free on a shaft 138 journaled in the machine side frames.

The segment 137 carries a stud 139 which engages a camming slot in a zero elimination cam plate 140 pivotally mounted on a stud 141 in a segmental gear 142 free on a shaft 143, journaled in the side frames of the machine. The teeth of the segmental gear 142 mesh with the external teeth of an external-internal ring gear 144, the internal teeth of which mesh with a pinion which drives a square shaft. The square shaft in turn drives similar pinions meshing with the internal teeth of gears similar to the gear 144, the external teeth of which gears are adapted to mesh with and drive corresponding denominational type wheels in each row of the column-printing mechanism, which column-printing mechanism in the present case is for the purpose of printing on an inserted slip or check at the extreme left of the machine, for printing on the individual listing tapes to be hereinafter described, and also for printing on a master tape located at the extreme right side of the machine.

This method of driving the type wheels of the column-printing accounting machine is fully explained in the previously mentioned Arnold Patent No. 2,141,332 and embodies an application of the driving mechanism disclosed in the above-mentioned Kreider Patent No. 1,693,279.

For the purpose of properly alining the differential mechanism and the type wheels set thereby, there is provided on each of the segments 134 a series of notches 147 engaged by an aliner 148 secured to a shaft 149.

The aliner 148 is disengaged from the notches 147 during the differential setting of the type wheels, and, after they have been set under the control of the keys through the differential mechanism, the aliner 148 is again moved into engagement with the notches 147, thus positively alining the type wheels.

The zero elimination mechanism above mentioned, which is for the purpose of controlling the printing of zeros and which is controlled by the above-mentioned zero elimination cam plate 140, is not directly involved in the invention in the present application, and therefore no further reference to the zero elimination mechanism will be given herein, such type of zero elimination mechanism being illustrated and described in the above-mentioned Arnold Patent No. 2,141,332.

Totalizers

The machine of this invention has two lines of the usual well-known interspersed adding totalizers, one line being located on a rear or No. 2 totalizer line and the other line being located on a front or No. 3 totalizer line, and, in addition, has one add-subtract totalizer or crossfooter on the No. 1 totalizer line, which is known as the "upper line."

The add-subtract totalizer or crossfooter on the No. 1 line is indicated by the reference numeral 157. The totalizer wheels of the totalizers on the No. 2 or back line are indicated by the number 158, and the number 159 indicates the interspersed totalizers on the front or No. 3 totalizer line.

Totalizers of these types are old and well known in the art and are fully illustrated and described in the previously mentioned Shipley patents, and therefore no further description of the construction of these totalizers is thought necessary herein.

As is usual in machines of this type, the actuators 101 are divided into three tooth sections as shown at 160, 161, and 162 in Fig. 3. The sections 160 actuate the add-and-subtract totalizer or crossfooter on the No. 1 line, the tooth sections 161 actuate the totalizers 158 on the No. 2 line, and the tooth sections 162 actuate the totalizers 159 on the front or No. 3 line.

In adding operations, the wheels of the selected totalizer or totalizers, as the case may be, are engaged with their respective sets of actuating tooth sections 160, 161, and 162 of the actuators 101, after said actuators have completed their setting movement in a clockwise direction under control of the amount keys 76.

Return movements counter-clockwise of the actuators 101, as explained above, rotate the corresponding wheels of the selected and engaged totalizer or totalizers in proportion to the value of the depressed amount keys 76 to enter into said totalizers the amount corresponding to the keys depressed.

In subtract operations, the corresponding subtract wheels of the balance totalizer or crossfooter 157 are engaged with the teeth 160 of the actuator 101 exactly the same as in adding operations, and the return movement of the actuator reversely rotates the adding wheels 157 of the crossfooter through the reverse gearing shown in Fig. 3, which is well known in the art and shown in several of the above-mentioned Shipley patents.

If no amount key 76 of a bank (Fig. 3) is depressed, the zero stop pawl 99 of that bank remains in the path of the spider 100 and, upon initial movement of the spider by the actuator 101, engages said spider and breaks the latch 109 to locate said actuator in zero position. After the actuator 101 is positioned at zero, the roller 126 positions the beam 128, the link 133, and the segments 134 and 137 in proportion thereto, as shown in Fig. 3. At the end of any type of operation, the actuator 101 is always returned to home position, as shown in Fig. 3. However, the links 133 and the indicating and printing mechanisms controlled thereby remain in set positions at the end of machine operations and are moved directly from these positions to their new positions in the succeeding operations of the machine through the beam mechanism, which is old and well known in the art and is often referred to as the "minimum movement device." The usual tens transfer mechanism is provided for transferring positive and negative tens transfers from lower to higher denominations.

Transaction keys

The transaction keys 77 of row one have various features. The "block No." key 77 is a key which controls an operation in which only printing takes place and is used for causing the printing of identifying block or batch numbers of deposits which may be going through the proof department and to which batches or blocks of deposits the department head may wish to assign a special number for the purposes of checking later on. The "lock release" key 77 is not directly involved in the invention herein and is used to release the machine for operation when an error has been made. For example, in running a deposit through the machine, the operator first sets up the total deposit, which we will say is $100.00, and this deposit is made up of three checks, one $50.00 check and two $25.00 checks. For the first operation, the operator sets up $100.00 and depresses the "20" key in the first row, which key selects the positive wheels of the add-and-subtract totalizer or crossfooter on the No. 1 totalizer line to cause the amount to be entered additively thereon and at the same time selects a group total on the No. 3 line. This is one operation. This deposit of $100.00 is now distributed, and we will say, for example, that two of the checks came from the local bank No. 1 and one check came from local bank No. 2. The next step for the operator is to set up, we will say, the amount of the $50.00 check and depress the "local bank No. 1" key in row two, which releases the machine for operation. This causes the amount of $50.00 to be subtracted from the crossfooter and to be added into the totalizer selected by the "local bank No. 1" key 78. Next, the operator sets up $25.00 and depresses the "local bank No. 1" key, which causes $25.00 to be subtracted from the crossfooter and added into said selected totalizer. Now, for the third operation, $25.00 should be set up, but we will say for the purposes of illustration here that the operator sets up $26.00 and depresses the "local bank No. 2" key. This subtracts $26.00 from the crossfooter, leaving the crossfooter not at zero but in a state where $1.00 is on the minus side thereof. The operator does not know that a mistake has been made and therefore proceeds to set up the total amount of the deposit for the next person. When the total deposit has been set up on the amount keyboard, the operator then depresses the "20" key 77, but it will not release the machine, because the crossfooter or add-subtract totalizer is not at zero, since there was an error made during the distributing of the last deposit. Therefore, the operator now depresses the "error" key 85 to determine how much of an error there is in the crossfooter and whether or not it is on the positive or the negative side of the crossfooter, and immediately finds that there is $1.00 on the negative side of the crossfooter.

Therefore, 1 is now set up on the keyboard in the $1.00 column of amount keys, and the "lock release key" 77 in row one is depressed in combination with the "20" key of row one, whereupon the $1.00 is added on the crossfooter, leaving the crossfooter in zero position. This amount of the error is printed on the master tape, which will be hereinafter described.

The "19" key 77 of row one is used for entering all other types of transactions or credits which are to be run through the machine in the proof department; for example, a credit letter may come in from an out-of-town bank and this may be run through and set up in conjunction with the "19" key and then distributed in succeeding operations and classified as necessary. This "19" key also controls the selection of the add-subtract totalizer or crossfooter on the No. 1 line and at the same time causes the selection of a group total on the No. 2 row of totalizers.

The distributions of the amounts set up in conjunction with the "19" key are made in exactly the same way as the bank customers' deposits are set up and distributed, as above described.

In other words, the "20" key is used for the checking account deposits of the bank customers, and the "19" key is used for all other types of credits which are to be distributed and charged against various accounts by the keys of rows two and three.

Figure 4:
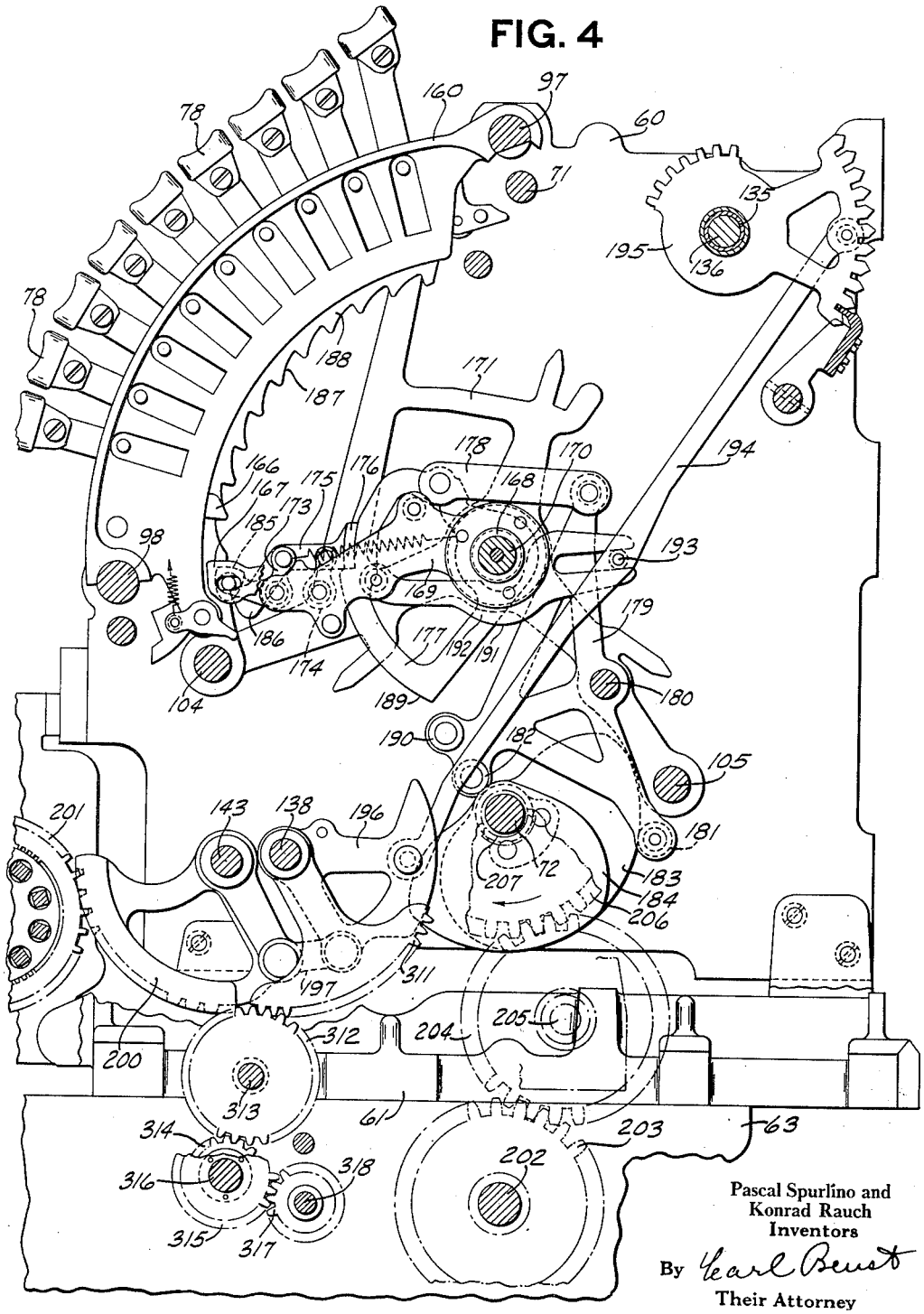
Fig. 4 is a sectional view of the machine, taken to the right of the second transaction bank or row 2, and shows said bank and the differential mechanism associated therewith.

The keys 78 of row two select related totalizers on the No. 2 line of interspersed totalizers, shown in Fig. 3. This bank of keys controls a differential mechanism, as illustrated in Fig. 4. These keys are numbered 1 to 9 and have other designations thereon. Each of the keys "1" to "7" of the second row of transaction keys selects printing mechanism and individual listing tape for the purpose of printing on that tape the distributions of deposits made by the bank's customers. This is done for the purpose of furnishing other banks, which request them, lists of checks which are paid through the bank having one of the machines of the present invention in their proof department. These individual listing tapes and the means for selecting them and for printing on them, under control of the keys of row two—that is, the first seven keys of row two—will be hereinafter described in detail. The keys "8" and "9" of row two are used for the purpose of distributing miscellaneous transactions and cash items, as indicated on the keys.

Each of the keys 79 of row three, numbered "10" to "18," controls the selection of a totalizer on the No. 3 line (Fig. 3). These keys are used for distributing various items, as indicated on the keys in Fig. 2.

It is to be understood, however, that the indications on these keys do not have to be as they are shown, these being merely for illustrative purposes. Many banks desire other types of breakdown, and the captions on the keys can be changed to correspond to the type of breakdown used in the bank to which the machine has been sold.

All the keys of rows one, two, and three are "motorized" or "operating" keys and cause the machine to be released upon the depression thereof when distributions are made. The differential mechanisms associated with these rows of keys are substantially the same; and therefore a description of the row of keys 78 and the differential mechanism associated therewith will be given. As this differential mechanism is differentially controlled in a manner similar to the amount differential mechanism described above and is fully illustrated and described in the patents referred to hereinbefore, only a brief description thereof will be necessary herein. As above stated, these keys 78 control a transaction differential mechanism which selects the totalizers corresponding to the keys and which positions the printing wheels for printing symbols corresponding to the keys. This particular differential mechanism also controls the mechanism for selecting one of the seven individual listing tapes to be printed upon, which tapes will be hereinafter described in detail.

The keys 78 are supported in a key frame carried by the previously-described rods 97 and 98. Depression of one of the keys 78 rocks a zero stop pawl 166 (Fig. 4) for this transaction bank out of the path of the forward end of a spider 167 pivoted on a hub 168 of a differential arm 169 turnably supported by a stud 170 extending between identical support plates (only one here shown) mounted on the rods 104 and 105. The spider 167 has in the forward end thereof a slot which engages a stud in a differential latch arm 173 pivoted on the arm 169, and said arm, in cooperation with an arm 174 also pivoted to the arm 169, supports a transaction differential latch 175 for radial shifting movement. The latch 175 has a foot-shaped extension 176, which cooperates with a shoulder on a differential operating segment 177 pivoted on the stud 170 and connected by a link 178 to a lever 179 fulcrumed on a stud 180 supported by the plate 171. Extensions on the lever 179 carry rollers 181 and 182, which cooperate respectively with the peripheries of companion plate cams 183 and 184 secured to the main drive shaft 72.

Depression of any one of the keys 78 moves the lower end thereof into the path of a forward extension 185 of the latch arm 173, whereupon operation of the machine causes the cams 183 and 184, which, as previously explained, make one clockwise revolution in an adding and subtracting operation, to rock the lever 179 and the segment 177 clockwise, whereupon the extension 176 carries the latch 175, the differential arm 169, and the spider 167 clockwise in unison therewith until the extension 185 of the latch arm 173 engages the stem of the depressed key 78. This rocks the arms 173 and 174 counter-clockwise to shift the latch 175 forwardly to disengage the foot 176 from the shoulder of the segment 177 and to engage a rounded nose 186 on an extension of the latch 175 with the proper one of a series of alining notches 187. These notches 187 correspond to the different positions of the second transaction differential and are cut in a plate 188 supported by extensions of the plate 171 and the rod 104. This positions the transaction differential mechanism in proportion to the depressed transaction key 78 without interfering with the oscillating movement of the segment 177 and connected parts. After the latch 175 is disengaged from the shoulder of the segment 177, an arcuate surface 189 on the periphery of the segment, in cooperation with the sole of the foot 176, locks the latch in the corresponding notch 187 to retain the differential mechanism in set position.

When the lever 179 nears the terminus of its initial movement clockwise, a roller 190 carried thereby engages the under surface 191 of a beam 192 pivotally mounted on the differential arm 169 and forces an arcuate upper surface of the beam into contact with an undercut portion of the hub 168 to position said beam 192 in proportion to the depressed transaction key 78. The rearward end of the beam 192 embraces a stud 193 of a link 194 pivotally connected at its upper end to a gear sector 195 secured to one of the nested sleeves 135 rotatably supported by the shaft 136. This link 194 is also pivotally connected at its lower end to a printer positioning segment 196 secured to the shaft 138. The link 194 transmits the differential positioning of the beam 192 to the sector 195 and the segment 196, said sector 195 being adapted to control mechanism which shifts the set of wheels of the totalizers on the No. 2 line to select the appropriate totalizer, according to the key 78 depressed, into alinement with the corresponding amount actuators 101.

The segment 196 (Fig. 4) is connected by a link 197 to a gear sector 200, the teeth of which mesh with the external teeth of an external-internal drive gear 201, similar to the gear 144. The gear 201 is operatively connected to the type wheels and the indicators for the second transaction bank by means of internal teeth therein, in cooperation with drive pinions mounted on a square shaft and other internal-external gears according to the principle shown and described in the above-mentioned Kreider patent.

The mechanism described immediately above transmits the differential positioning of the beam 192 to the type wheels and indicators for the second transaction bank, whereupon operation of the printing mechanism causes a symbol characteristic of the depressed transaction key 78 to be printed on the desired one of the individual listing tapes selected, on an inserted slip or check, and also on the master tape or audit strip.

PRINTER

Printer driving means

All of the operating cams in the printing mechanism are driven from a printer drive shaft 202 (Figs. 4, 6, and 7), which receives its movement from the machine cam shaft 72 in the following manner:

Secured to the shaft 202 is a gear 203 meshing with a gear 204 mounted on a stud 205 in the base 61. The gear 204 meshes with a gear 206 mounted on a stub shaft 207 in axial alinement with the machine drive shaft 72. The ratio of the gears 203, 204, and 206 is such that one revolution of the shaft 72 causes one revolution of the printer drive shaft 202. The stub shaft 207 is connected to the main shaft 72 by a clutch mechanism (not shown), which functions in total-printing operations to disconnect the stub shaft 207 from the main shaft 72 during the first cycle of said total-printing operations to prevent any operation of the printer mechanisms during said first cycle. This clutch mechanism, for preventing operation of the printer shaft during the first cycle of a totaling operation is of the same principle, as that shown and described in the above-mentioned Shipley Patent No. 1,619,796.

Individual listing tapes

As has been previously stated, this invention includes a novel printing mechanism which is able to furnish certain banks, which require them, individual lists of all the checks drawn on said certain banks, which checks have been cashed by the bank using one of the machines of this invention. To accomplish this result, the machine is provided with seven individual listing tapes, upon each of which is printed a list of the checks cashed and the totals thereof. The number of the tapes may be more or less than the seven shown, depending upon the requirements of the system of the bank in which the machine is used. These individual listing tapes are mounted in the front part of the machine, as clearly shown in Fig. 1, and are removable from the machine, so that it is a very easy matter to replace the paper roll when it has been exhausted. Also, extra frames which contain a fresh supply of listing tape may be provided for the banks, so that if they wish they may have one always ready to replace a frame in which the supply of tape has been exhausted, so that there will be no appreciable amount of time lost in replenishing the supply of tape during the busy hours of the day. In Fig. 1, the lids of two of the tape frames are shown opened, and in one case one of the frames is shown about to be withdrawn from the machine. The cabinet 70 is provided with openings 211, so that several items on each tape are visible to the operator without having to remove the frame from the machine. Figs. 26 and 27 show a portion of a strip from each of two different frames. These strips are given the reference number 212. As has been previously stated, the present machine is provided with seven individual listing tapes, which are selected under control of the first seven keys 78 (Figs. 1 and 2) of row two of the transaction keys.

Since the individual listing tape frames are all alike, and the mechanism for operating the hammers for the tapes and also the feeding mechanism for the tape are similar for each of said tapes, a description of one frame, the hammer operating means for its tape, and the feeding means for the tape will suffice for all.

The seven individual tape frames are supported on a plate 213 (Figs. 13 and 14) secured to the bottoms of the frames 63 and 64 (Figs. 5A and 5B). The plate 213 has secured to the top thereof seven U-shaped guides 214, one for each of the individual listing tape frames, which guides have lateral flanges 215, the purpose of which will be hereinafter explained.

Referring now particularly to Figs. 13, 14, and 15, each of the frames is composed of side plates 216 and 217 tied together near their lower edges by three rods 218, 219, and 220 and near their upper edges by four rods 221, 222, 223, and 224. The rods 218 and 220 rest on top of the flanges 215, and studs 225, one in each of the plates 216 and 217, ride underneath the flanges 215. The plates 216 and 217 are also provided with flanges 226 and 227, which ride underneath the flanges 215. Therefore, the listing tape frame is kept from any lateral movement and also from any up-and-down movement, the flanges 226 and 227 preventing lateral movement and also preventing any movement of the frame too far in an upward direction. Pivoted on a stud 230 on the plate 216 is a spring-actuated latch 231, having a nose 232 to latch over the tie bar 66 when the frame is properly located in its operating position in the machine.

To remove the frame from the machine, the operator merely depresses the forward end of the latch 231 to release the nose 232 from the tie bar 66, whereupon the entire frame may be withdrawn from the machine.

The item tape or strip 212 is fed from a supply roll 233 over rollers 234 on the rods 221 and 223 and around a roller 234 on the rod 222, over a knurled feed roll 235 mounted on the rod 224, and underneath a knurled tension roll 236 carried on a lever 237 pivoted on a stud 238 on the side plate 217 and held in contact with the paper strip by a spring 239. The strip 212 is then fed over a guide plate 240 and underneath a serrated tear-off plate 241, so that the strip may be torn off by the operator when the listing of the checks has been completed.

Sometimes a list of checks is quite long, and, therefore, to provide a place for the end of the strip, the lid 250 of the frame has secured thereto a curved guide 251, whereby the end of the paper is automatically coiled up within this lid as it is fed forwardly after the printing of each item thereon. Each lid also has secured thereto a guide plate 249 (Fig. 1) to keep the ends of the strips from coming in contact with one another due to the close proximity of the frames in the machine. Each of the lids 250 has secured thereto a pair of arms 252, which are pivoted on a common rod 253, supported by the forward ends of all of the U-shaped guides 214. Each of the plates 216 and 217 has a shoulder 254 (Figs. 1 and 13), which shoulder contacts the inner side of the rod 253 should the operator withdraw the frame too rapidly, thus preventing the frame from being dropped on the floor and damaged. To finally complete the removal of the frame, it is necessary to tilt the forward end thereof upwardly until the shoulders 254 are above the rod 253.

The lid 250 is held in its closed position by a spring-pressed latch 255 (Fig. 13), the right end of which latches over a keeper 256 secured to the left side plate 217. The latch 255 is pivoted on a stud 257 and has a button 258 secured to a bent-over portion thereof, which button projects through a hole 259 in the top section of the lid 250 and is flush with the top thereof. Therefore, when it is desirable to remove one of the frames, the operator merely depresses the button 258, which raises the latch 255 from its keeper 256, whereupon the entire lid hinges on the rod 253 and can be moved downwardly into the position shown in Fig. 1.

*Interlock between listing tape frame and machine releasing mechanism*

It is absolutely necessary that all of the seven individual listening tape frames be properly latched in their operating positions in the machine before the machine can be released for operation. To make sure that this happens and that none of the frames are out of the positions, there is provided an interlocking mechanism, which will now be described.

Referring particularly to Figs. 13 and 15, it will be noticed that in Fig. 13 the frame is shown in its latched position with the nose 232 latched over the tie bar 66, which is the proper operating position for the frame and in which position the machine can be released for operation, while in Fig. 15 the frame is shown released; that is, the nose 232 of the latch 231 is shown as being on top of the cross-bar 66. In this position it is absolutely impossible to release the machine for operation.

A rod 260 carried by the printer frames 63 and 64 supports a plurality of spring-drawn arms 261, one for each of the individual tape frames and held in contact with its respective rod 218 by a spring 262. The spring 262 is connected to a hook on the tie bar 66 and a stud 263 on the arm 261. As all of these arms are loosely pivoted on the rod 260, and as they all act in the same manner in connection with the rods 218, the description will be given in connection with one of the frames only. Another shaft 264 carried by the frames 63 and 64 has secured thereto a plurality of arms 265 (see also Figs. 5A and 5B). Also secured to the shaft 264 is an arm 266 (Figs. 5A, 15, and 16) having connected thereto a spring 267, the function of which is to hold each of the arms 265 in contact with its associated stud 263 in the arm 261. Also secured to the shaft 264 is an arm 268 (Figs. 5A and 15) having pivoted thereto a link 269, which is also pivoted to the lower end of a lever 270 pivoted on a shaft 271 supported by the frames 62 and 63. The upper end of the lever 270 has a shoulder 272 adapted to cooperate with a square stud 273 on an arm 274 pivoted on a stud 275 carried by the side frame 60. Pivoted to the arm 274 is a link 276, the upper end of which is pivoted to the usual clutch release lever 277 fast on the key lock line or release shaft 71, which, as previously stated, is rocked in a clockwise direction to release the motor for operation to drive the machine when one of the "motorized" keys 77, 78, or 79 is depressed and also when either of the keys 84 or 85 is depressed. A spring 278 connected to the link 276 assists in rocking the lever 277 clockwise upon release of the machine when the shoulder 272 has been moved from beneath the square stud 273.

When the parts are in their normal position—that is, when the individual listing tape frames are latched in their operative positions—the rods 218 contact the arms 261 and hold said arms in the positions shown in Fig. 13, thus putting a tension on the springs 262. With the arms 261 in such positions, the spring 267 holds the arms 265 in contact with the studs 263 and at the same time holds the lever 270 in a position whereby the shoulder 272 thereof is out from under the square stud 273, so that the machine can be released for operation by a clockwise rocking of the lever 277, which rocks the arm 274 downwardly.

When any one of the individual tape frames has been released and drawn slightly forward, as shown in Fig. 15, its associated arm 261 is drawn forwardly by its spring 262, and, this spring being stronger than the spring 267, the stud 263, through the contact with its associated arm 265, rocks all of the arms on this shaft 264, and the shaft 264, in a clockwise direction from the position shown in Fig. 13 to that shown in Fig. 15. This rocking takes place until a finger 279 on the upper part of the arm 266 contacts the rod 260. Such clockwise rocking of the shaft 264 rocks the arm 268 clockwise a like extent, whereupon the link 269 rocks the lever 270 clockwise into the position shown in Fig. 15, whereby its shoulder 272 lies beneath the square stud 273. Lever 270 in this position accordingly prevents any movement of the arm 274, the link 276, the clutch release lever 277, and the key lock line or release shaft 71, thus preventing any operation of the machine when any one of the individual tape frames is out of its normal latched position.

*Individual strip feeding mechanism*

As previously stated, the tape 212 is fed between the knurled feed roll 235 and the knurled tension roll 236 (Figs. 13 and 14).

Connected by a hub 285 (Fig. 17) to the knurled feed roll 235 is a ratchet 286, which has cooperating therewith a feed pawl 287 pivoted on an arm 288 and held in contact with the ratchet 286 by a spring 289. The arm 288 is pivoted on the rod 224. Pivoted at 290 to the arm 288 is a link 291, supported near its other end to slide on a stud 292 carried by the side plate 217. A spring 294 connected to the link 291 normally holds the parts in the positions shown in Fig. 17 and, after a feed operation, returns the pawl and the arm 288 to their normal positions. A retaining pawl 295 pivoted on a block 1296 carried by the plate 217 prevents any retrograde movement of the ratchet and feed roll 235 during return movement of the pawl 287 and the arm 288.

The link 291 carries a stud 296 adapted to be engaged by a slot 297 in the forward end of a link 298 pivoted at 299 to an arm 300 fast on a shaft 301, which shaft is supported by the frames 63 and 64 (Figs. 5A and 5B). A link 302 is connected to the arm 300 and to a bell crank 303 loosely pivoted on a shaft 304. The bell crank 303 carries rollers 305 and 306 cooperating with plates 307 and 308, respectively, of a double plate cam secured to the printer drive shaft 202.

As above stated, the slot 297 of the link 298 is normally disconnected from the stud 296, but, by means to be hereinafter described, when one of the individual listing tapes is selected for operation, the link 298 is permitted to rock counter-clockwise, whereupon the slot 297 embraces the stud 296. During an operation of the machine, the cams 307 and 308 rock the arm 300 first clockwise and then counter-clockwise to normal position. When the link 298 is engaged with the stud 296, the clockwise movement of the arm 300 draws the link 291 to the right (Fig. 17), thereupon rocking the arm 288 and causing the pawl 287 to turn the ratchet 286 and consequently the feed roll 235 to feed the listing tape after the printing has taken place thereon. There are only one pair of cams 307 and 308, one bell crank 303, and one link 302 for all seven of the individual listing tapes. However, there is an arm 300 fast to the shaft 301 for each of the seven listing tapes.

As only one of the listing tapes is selected for operation at a time, it becomes necessary to select which of the tapes shall be printed upon and therefore which of the tapes shall be advanced after the printing.

*Individual listing tape selecting means*

The means for selecting which of the seven individual listing tapes is to be operated is under control of the first seven keys 78 (Fig. 2) numbered "1" to "7," the first four of these seven keys in the present instance being allocated to local banks Nos. 1, 2, 3, and 4, and the other three being allocated to transit banks Nos. 1, 2, and 3 for the distribution of cancelled checks on those banks.

Referring now to Fig. 4, it will be recalled that the segment 196 and the shaft 138 are differentially positioned under control of the keys 78 of row two. For the purposes of selecting the individual listing tapes for operation, and consequently for selecting the feeding mechanism thereof, only the first seven keys 78 need be considered, as there are in the present machine only seven individual listing tapes. Since the shaft 138 is differentially positioned by the differential mechanism of Fig. 4 under control of the keys 78, a segment 311 secured to the shaft 138 will also partake of such differential movement.

This gear segment 311 meshes with a gear 312 mounted on a stud 313 carried by the base 61. Meshing with the gear 312 is a gear 314 fastened to a gear 315, both of which are loose on a shaft 316. The gear 315 meshes with a gear 317 (see also Fig. 5B), which is fast on a shaft 318 supported by the printer frames 62 to 65. Also secured to this shaft 318 are seven pinions 319, one associated with each of the individual listing tapes. These pinions 319, through the gearing just described, partake of the differential movement given to the segment 311 under control of the keys 78 of the second control row. Each pinion 319 meshes with a gear 320 having secured to the side thereof a disk 321. The gear 320 and the disk 321 are loosely mounted on the shaft 316. There are, of course, seven of the gears 320 and seven disks 321. Each of the disks 321 has a notch 322. These disks are so arranged on the shaft 316 that the notches 322 are located at different angular positions about the shaft 316, as clearly shown in Fig. 21. Also loose on the shaft 316 and adjacent to the disks 321 and the gears 320 are seven other disks 330, each having secured to the side thereof a gear 331. The disks 330 in this embodiment are not notched, so that they exert the same control in all positions thereof. The manner in which disks 330 are positioned will be explained hereinafter.

Cooperating with the disks 321 and 330 are the noses 332 and 333, respectively, of a double-ended pawl 334 (Fig. 17) carried a lever 335 pivoted on a shaft 336 supported by the printer frames 63, 64, and 65 (Figs. 5A and 5B). This lever 335 is held, by a spring 339, in contact with a stud 337 of an arm 338 secured to the shaft 336, in which position the noses 332 and 333 of the pawl 334 contact the peripheries of the disks 321 and 330, respectively. The lever 335 carries a stud 340 projecting into a slot 341 of the previously-described feeding link 298, to normally hold this link with its slot 297 disengaged from the stud 296 in the normal position of the parts.

Secured to the shaft 336 is an arm 342 (Figs. 5B and 19) connected by a link 343 to a bell crank 344 loosely pivoted on the shaft 304. This bell crank 344 carries rollers 345 and 346 cooperating with plates 347 and 348, respectively, of a double plate cam, which is secured to the printer drive shaft 202.

Upon operation of the machine, the cams 347 and 348, through the bell crank 344, the link 343, and the arm 342, cause a counter-clockwise movement of the shaft 336 and then a clockwise movement of the shaft to its normal position. Upon counter-clockwise movement of the shaft 336, all of the arms 338 secured thereto are rocked counter-clockwise and, through the springs 339, tend to move the pawls toward the disks. As explained above, the notches 322 on the disks 321 are located at different points about the shaft, so that the differential positioning of the shaft 316 and the disks 321 under control of the "1" to "7" keys 78 of row two will bring one of the notches 322 opposite the nose 332 of its related pawl 334. This nose 332 entering the notch 322 will enable the lever 335 to move with its related arm 338, whereupon the stud 340 rocks the link 298 counter-clockwise about its pivot 299 to cause its slot 297 to engage the stud 296 of the feed link 291. The noses 332 of the pawls cooperating with the other disks 321 at this time will not be able to enter notches 322, but will engage the periphery of these disks and prevent the operation of their levers 335 by the arms 338 on shaft 336, the springs 339 connecting these sets of arms yielding at this time.

With the parts in the positions just described, when the cams 306 and 307 rock the arms 300 clockwise, the link 298, being coupled with the link 291, will move said link 291 to the right, causing a counter-clockwise movement of the arm 288 and an upward movement of the feed pawl 287 to turn the ratchet 286 and the feed roll 235 counter-clockwise to feed the individual listing tape after printing on said tape has taken place.

Upon counter-clockwise movement of the arm 300 to its normal position, the link 291 is moved to the left, aided by its spring 294, to its normal position, and, after this takes place, the cams 347 and 348 (Fig. 19) return the shaft 336 and all of the arms 338 secured thereto to their normal positions, whereby the operated lever 335 is rocked clockwise by the stud 337 to its normal position, whereupon the stud 340 disconnects the slot 297 from the stud 296 of the feed link 291, thus leaving the parts in the normal positions, shown in Figs. 17 and 19, at the end of the operation of the machine.

In the subsequent operation of the machine, a different one of the "1" to "7" keys 78 in row two may be depressed, whereupon the disks 321 are rotated so that a different one of the notches 322 will select a different one of the levers 335 for operation, which lever is related to the key that has been depressed.

For the purpose of feeding a tape 212 by hand, each feed roll 235 has clutched thereto a knurled hand wheel 349 (Figs. 5A, 5B, 13, and 14), which wheel can be easily turned by hand to feed the tape 212 whenever desirable.

*Individual listing tape impression means*

There is associated with each of the individual listing tapes a group of type wheels 350, shown particularly in Figs. 13 and 18. These type wheels are set by the internal gear drive mechanism through the gears 144 (Fig. 3) exactly as illustrated and described in the previously-mentioned Kreider United States patent.

There is also associated with each of the seven individual listing tapes a printing hammer and mechanism for operating and controlling these hammers.

For each of the tapes there is an impression hammer 351 (Figs. 5A, 5B, and 18) carried by a pair of arms 352 hubbed together and loosely pivoted on a rod 353 supported by the printer frames 62, 63, 64, and 65. A stud 354 carried by the arm 352 supports a hammer-adjusting arm 355 pivoted to the upper end of a lever 356 loose on a rod 357 carried by the printer frames 62 to 65 inclusive. The lower end of the lever 356 is contacted by the tie rod 219 of the listing tape frame and holds the hammer in the position shown in Fig. 18 when the frame is latched in the machine in its operative position.

When the frame is withdrawn from the machine, the weight of the hammer 351 causes it to rock counter-clockwise about rod 353 to a position where there will be no interference between the hammer and the rolls 234 which support the strip. As the hammer 351 rocks counter-clockwise, it will cause the lever 356 to rock clockwise until the lower end engages the tie bar 66, which limits the counter-clockwise movement of the hammer under these circumstances.

The lever 356 carries a stud 358 adapted to cooperate with a notch 359 in a link 360 pivoted to an arm 361 secured to the shaft 304. The link 360 is connected by a link 367 to the previously-described lever 335, which, it will be recalled, is controlled as to its operation by the position of the disks 321 and notches 322 under control of the first seven keys 78 of the second control row. Therefore, when the feeding mechanism, as shown in Fig. 17, has been selected for operation by the positioning of the notch 322 opposite the nose 332 of the pawl 334, simultaneously therewith the link 360 is rocked counter-clockwise about its pivot on the arm 361, whereupon the notch 359 engages the stud 358 of the lever 356, and therefore, when the shaft 304 is rocked clockwise in a manner to be hereinafter described, the lever 356 is rocked counter-clockwise, whereupon the adjusting arm 355 raises the hammer 351 to contact the strip against the differentially positioned amount type wheels 350 to print on the listing tape the amount set up under control of the amount keys 76.

The link 360 (Fig. 18) is moved first to the right and then to the left, at each operation of the machine, by means of two pairs of double plate cams each consisting of cams 362 and 363 cooperating with rollers 364 and 365 on bell cranks 366 secured to the shaft 304. Therefore, unless one of the notches 322 is positioned opposite the nose 332 of the pawl, the back-and-forth movement of the link 360 is merely idle. As a matter of fact, it is idle in all of the cases except that of the particular individual listing tape which has been selected for operation.

Should it be desired to disable the operation of one of the individual listing tape recording means, even though it has been selected, there is provided on each of the frames a slide 370 (Figs. 17 and 19) slidably mounted on studs 371 supported by the side plates 217. This slide 370 has a foot 372, which is adapted to be moved underneath a stud 373 on the lever 335 whenever it is desired to disable the feeding and printing mechanism associated with the particular strip whose frame side 217 carries the slide which has been moved to the position where the foot 372 is beneath the stud 373. When in such position, the slide assumes the position shown in Fig. 19. Thus it can be seen that, with the lever 335 prevented from moving counter-clockwise, even though it has been selected by moving a notch 322 in the disk 321 opposite the nose 332 of its related pawl 334, the hammer-operating link 360 cannot engage the stud 358, and, therefore, the hammer 351 cannot be operated, and, likewise, the slot 297 of the link 298 cannot engage the stud 296 of the feed link 291, and, therefore, there can be no feeding operation of the strip.

From the above description, it can be seen that any one of the seven individual listing tape feeding and impression mechanisms may be selected under control of the first seven keys in row No. 2. It can also be seen that the machine cannot be operated unless all seven of the tape frames are positively latched in their proper operating positions in the machine.

Master tape

A master tape 380, illustrated in Figs. 22 and 25, is also adapted to be printed by the machine shown in connection with this invention. In previous machines of this general type, the master tape or audit strip was usually fed across the front of the machine. However, in the present invention, the master tape is fed from the back to the front of the machine and is located at the extreme right-hand side of the machine between the printer frames 64 and 65, shown in Fig. 5B. This tape is fed from a supply roll 381 (Fig. 6) over a roller 382 carried by a stud 383 supported by the frame 64, thence over a roller 384 and forwardly over a table 385 and underneath a guide 386, thence around a roller 387 supported by the table 385 and from here over a roller 388 mounted on a stud 389, supported by the frame 64, and thence between a feed roller 390 and a pair of tension rollers 391, only one of which is shown. In order that the last print on the master tape may be visible, the cabinet 70 is provided with an opening 392 (Fig. 1). In order that the last print on the master tape 380 shall be visible, so that it can be read through the opening, the table 385 and the rollers 384 and 387 are movable, so that there will not be much waste of paper between prints. In other words, this table is movable toward the right (Fig. 6) to bring the last printed impression adjacent the groups of amount type wheels 379, which are set aside to print on the master tape. This table 385 is moved in the following manner:

The table has a projection 393 adapted to engage a stud 394 in an arm 395 fast on a shaft 396 supported by the frames 64 and 65. Also fast on the shaft 396 is an arm 397 carrying the roller 398 cooperating with a cam race 399 in a disk 400 secured to the printer drive shaft 202. The race 399 causes first a clockwise and then a counter-clockwise movement of the arms 395 and 397, whereupon the table is slid first to the right (Fig. 6) to bring the last printed impression adjacent the type wheels 379, and, after the new printing has taken place on the master tape or audit strip, the arms 395 and 397 are moved counter-clockwise to their normal positions, thus moving the table 385 back to the position shown in Fig. 6. The table is slidably mounted on studs 401 supported by the frames 64 and 65.

Master tape or audit strip feeding mechanism

As above explained, the master tape or audit strip 380 is moved from a reading position to a printing position, and then, after printing has taken place thereon, it is moved back to a reading position.

During the movement of the master tape from printing position to reading position, it is also fed either a long feed or a short feed, depending upon whether the operation of the machine is for the entering of items or for the taking of totals. Referring particularly to Figs. 6 and 7, the parts are shown in their normal positions at the beginning of an item-entry or add operation of the machine.

Normally, the mechanism is connected for a long feed, but, during the first part of the add or item-entry operation, the long feed mechanism is disconnected and the short feed mechanism is connected, so that, during item operations, a short feed is given to the master tape or audit strip. This long and short feed mechanism is controlled by the position of the total control plate 86 in a manner to be hereinafter described.

The means for feeding the audit strip will now be described. As above stated, the strip is passed between the knurled feed rolls 390 (Figs. 6, 8, and 9) and the tension rolls 391 (Figs. 6 and 9).

The tension rolls 391 are carried on bell cranks 411 (Figs. 6 and 9) pivoted on a shaft 412 carried by the frames 64 and 65. Each of the bell cranks 411 (only one of which is shown) has a stud 413 held in contact with an arm 414 by a spring 415. These arms 414 are used to release the tension rolls 391 from the feed roll 390 when the master tape 380 in the machine is fed by hand. To release these tension rolls 391, there is fast on the shaft 412 an arm 416 cooperating with a stud 417 carried by an arm 418 pivoted on a stud 419. When it is desired to release the tension rolls 391 from the feed roll 390, the operator depresses the arm 418, moving it in a clockwise direction, whereupon the stud 417 cams the arm 416 and the shaft 412 counter-clockwise, thus moving the arms 414 likewise, and their engagement with the studs 413 raises the tension rolls 391 from the feed roll 390. The arm 418 has a retaining notch 420, into which the stud 417 fits when the arm 418 has been moved its maximum distance, thus retaining the tension rolls 391 fully disengaged from the roll 390.

Connected to the feed roll 390 by a mortise and tenon connection (not shown) is a feed ratchet 421 (Figs. 7 and 8), with which cooperates a feed pawl 422 pivoted at 423 on a lever 424 mounted on the hub of the ratchet 421. The pawl is held in contact with the ratchet 421 by a spring 425. Adjustably pivoted to the upper end of the lever 424 is a link 426, which is also pivoted to a lever 427 pivoted on a shaft 428 supported by the printer frames 62 to 65. By means to be hereinafter described, this lever 427 is rocked first counter-clockwise and then clockwise to its normal position. The counter-clockwise movement thereof rocks the lever 424, whereupon the pawl 422, through its cooperation with the ratchet 421, turns the feed roll 390 to feed the master tape or audit strip. A spring 1437 assists in returning the lever 424 and associated parts to their normal positions.

As above stated, there is both a long and a short feed given to the audit strip, the short feed being during item-entering operations and the long feed being during totaling operations.

The lever 427 carries two studs 429 and 430 adapted to be engaged by links 431 and 432, respectively, which links are both pivoted to a bell crank 433 loose on the shaft 304. The bell crank 433 has two rollers 434 and 435 cooperating with plates 436 and 437 of the double plate cam secured to the printer shaft 202. During adding operations of the machine, the cams 436 and 437, through the bell crank 433 and the link 432, which at that time, by means to be hereinafter described, is coupled with the stud 430 (and at the same time the link 431 is uncoupled from the stud 429), cause the counter-clockwise and clockwise rocking of the lever 427, previously described, to feed the audit strip.

It will be recalled that, during total-taking operations, the shaft 202 is not operated during the first cycle of a total-taking operation, but is operated during the second cycle thereof. During this second cycle, the link 431 is coupled to the stud 429, as shown in Fig. 6, and the link 432 is uncoupled from its stud 430, as shown in Fig. 7, whereupon the lever 427 is rocked counter-clockwise and clockwise, as previously described, only this movement is of a greater extent than that given the lever during adding operations, and consequently the audit strip is given a long feed between the impressions thereon.

The means for determining whether the link 431 or the link 432 will be coupled with the lever 427 comprises two pairs of control disks 440, 441, 442, and 443. The disk 440 is provided with a notch 444, and the disk 442 has a notch 445. These notches cooperate with noses 447 and 448, respectively, of feeler pawls 449 and 450, which also have noses 451 and 452 for cooperating with the disks 441 and 443, respectively. The pawl 449 is carried by a lever 453 pivotally mounted on the shaft 336 and is held, by a spring 456, in contact with a stud 454 on an arm 455 secured to the shaft 336. A link 457 connects the lever 453 with the previously-described link 432.

The pawl 450 is carried by a lever 460 held, by a spring 462, in contact with a stud 461 on the opposite side of the arm 455. Connecting the lever 460 and the previously-described link 431 is a link 463. The lever 453 has a stud 464 normally contacting a stud 465 carried by the lever 460.

As above stated, the disks 440, 441, 442, and 443 (Figs. 6 and 7) are in the positions which they occupy prior to the beginning of an adding operation of the machine. During adding operations, these disks remain in such positions, and, when the shaft 336 is rocked counter-clockwise by the cams 347 and 348 of Fig. 19 in the manner previously described, the arms 455 is rocked likewise, whereupon the springs 462 and 456 rock the levers 460 and 453, respectively, counter-clockwise, due to the fact that the noses 447 and 448 at this particular time can enter the notches 444 and 445, respectively, of the disks 440 and 442.

The counter-clockwise moving of the levers 453 and 460 through their links 457 and 463, respectively, rocks the links 432 and 431, so that the link 432 engages the stud 430 and the link 431 is disengaged from the stud 429 of the lever 427; therefore, when the cams 436 and 437 operate, the lever 427 is given a counter-clockwise and then a clockwise movement by the link 432, which movement, due to the fact that the stud 430 is farther away from the center of the shaft 428 than is the stud 429, is a shorter rocking movement than that given said lever 427 by the link 431, and consequently the lever 424 and the pawl 422 are moved a shorter distance, thus giving a short feed to the master tape or audit strip. Such short feed spacing is illustrated in Fig. 22. The long feed spacing on the master tape or audit strip 380 is best illustrated in Fig. 25, where the strip is shown attached to a proof balance sheet 466, which is preprinted in the "description" column with the classification names. The long feed of the master tape or audit strip 380 causes the totals of the various classifications to be printed, so that, when the strip is attached to the balance sheet 466, said totals will properly line up with their associated preprinted lines of the sheet. The studs 464 and 465 on the levers 453 and 460, respectively, are merely safety devices to always insure that the long feed link 431 is uncoupled from the lever 427 when the short feed link 432 is coupled to the lever 427.

On the other hand, the stud 465, being underneath the stud 464, prevents the link 432 from being coupled with the lever 427 when the link 431 is coupled with the lever for a long feed.

In all total and sub-total operations which are controlled by the depression of any of the keys 80 to 85 inclusive (Fig. 2), it is necessary to prevent any counter-clockwise movement of the levers 453 and 460, and therefore it is necessary to rotate the disks 440 and 442 so that the notches 444 and 445 thereof will be out of the paths of movement of the noses 447 and 448 of the pawls 449 and 450.

The means for moving these notches out of the paths of the noses of said pawls is controlled directly by the previously-mentioned total control plate 86 (Fig. 12). This mechanism will now be described.

Pivoted to the total control plate 86 (Fig. 12) in the usual manner is a link 470, which is connected to an arm 471 pivoted on the shaft 138. This arm 471 is connected to a gear segment 472, meshing with a gear segment 473 secured to a shaft 474. This shaft 474 has secured thereto a gear segment 475 meshing with a gear 476 fast on a shaft 477 supported by the printer frames 62 to 65. Also secured to the shaft 477 are two gears 478 (Figs. 5B, 6, and 7), each of which meshes with a gear 479 and a gear 480. The gear 479 is secured to the notched disk 442 and the gear 480 is secured to the notched disk 440.

Whenever the total lever is moved out of add position under control of any of the keys 80 to 85 inclusive, through the linkage and gearing described and illustrated in Fig. 12, the gears 478 are rotated to turn their associated disks 440 and 442 to remove the notches 444 and 445 out of the paths of the noses 447 and 448, so that, when the shaft 336 and the arms 455 are rocked counter-clockwise in the manner previously described, the noses 447 and 448 will contact true peripheries of the disks 440 and 442, thus preventing any counter-clockwise movement of the levers 460 and 453 and holding the links 431 and 432 in the positions shown in Figs. 6 and 7, whereby the master tape or audit strip 380 is given a long feed.

The shaft 477 also has secured thereto gears 481 meshing with gears 331, which gears are secured to the disks 330 associated with the individual listing tapes. As has been previously described, there are no notches in these disks 330, and therefore the movement of the shaft 477 under control of the total lever for total-taking operations to give a long feed to the master tape has no effect upon the feeding of the individual listing tapes, nor does it have any effect upon the hammers 351, which are associated with these individual tapes, because totals of lists are printed on these individual listing tapes, as shown in Figs. 26 and 27.

There is provided for the master tape a manual feed, so that, whenever necessary, the tape can be fed out independently of the machine feeding mechanism. This manual feed comprises a hand-operated lever 490 (Fig. 6) fast to a shaft 491, to which is also secured an arm 492 having a projection 493 contacting a stud 494 in a lever 495 carrying a pawl 496 held in engagement with the ratchet 421 by a spring 497.

To feed the master tape 380 by hand, the operator moves the lever 490 counter-clockwise, which, through the arm 492, lever 495, and pawl 496, rotates the ratchet 421 and consequently the feed roll 390 counter-clockwise, to manually feed the tape 380. Upon release of the lever 490 by the operator, a spring 498, connected to the lever 495, returns the parts to their normal positions. A stud 499 in an arm 500, fast on the previously-described shaft 412, acts as a stop for the arm 492 on its forward counter-clockwise movement, and on the return movement clockwise of the arm 492 by the spring 498, a stud 501 on the arm 492 contacts the under side of a downward projection on the arm 500, which acts as a stop for the lever and parts in this direction.

Should the operator desire to release the tension rolls 391 slightly and not lock them in their raised position, by depression of the arm 418 in the manner previously described, a slight clockwise movement of the lever 490 rocks the arm 492 clockwise until it is stopped by a stud 502 carried on the printer frame 64. This clockwise movement of the arm 492 through the stud 501 rocks the arm 500 and consequently the shaft 412 slightly in a counter-clockwise direction, whereupon the arms 414 (Fig. 9), through the studs 413, raise the tension rollers 391 from the feed rolls 390 just enough so that the master strip may be drawn forward by hand without danger of tearing the paper due to the pressure of the tension rolls 391 on the feed rolls 390 when they are not separated.

A retaining pawl 503, held in engagement with the ratchet 421 by a spring 504, prevents any retrograde movement of the ratchet 421 and consequently of the feed roll 390 during all types of feed operations, whether by hand or whether made by the machine.

As previously stated, the master tape or audit strip 380 is fed out of an opening 505 in the cabinet 70 (Fig. 1). It may not be desired to allow this paper to hang free, and therefore there is provided a hand-operated spool 506, supported by a bracket 507, so that the free end of the strip 380 may be wound thereon by hand as it is fed out of the machine.

*Master tape impression means*

There are two hammers 510 and 511 (Fig. 5B), which are used to print on the master tape from the type wheels 379. These hammers are of the same construction as the hammers 351 (shown in Fig. 18), and therefore it is thought that no further description of them need be given herein. They are operatively connected to arms 512 and 513 secured to the shaft 304 by means of links 514 and 515, respectively, which arms are actuated by the two pairs of cams 362 and 363 shown in Figs. 5A, 5B, and 18. There are two control disks 516 and 517 to control the hammer 511, the disk 516 having low spots corresponding to the previously-described notches 322 in all positions, so that the hammer 511 will print on the master tape during all item-entry and total-taking operations.

The hammer 510 is for the purpose of printing the consecutive number on the master tape, which consecutive number appears as the left-hand column of numbers in Fig. 22. During total-taking operations, it is desirable to omit the printing of the consecutive number, and therefore the hammer 510 is controlled by control disks 518 and 519 so that during all total-taking operations the printing of the consecutive number will be omitted from the master tape. The consecutive number is omitted also during operations in which the "error" key 85 is depressed, and also during operations in which the "block no." key 77 is depressed.

Since the printing of the consecutive number has no direct bearing in connection with the invention herein, it is thought unnecessary to go into any further description thereof.

*Slip printing mechanism*

As has been previously stated, the machine herein is also provided with a slip printing mechanism located at the extreme left of the machine and shown particularly in Figs. 5A, 10, and 11. This slip printing mechanism is adapted to print on the back of a deposit ticket 1507 (Fig. 23) the date, the consecutive number, the department number, the machine number, and the amount. The department or classification number, as well as the consecutive number, definitely ties up the deposits with other items listed on the master tape or audit strip, which has all of the above information printed thereon except the date.

The slip printer is also used to print identification data on the back of checks 508 as they are distributed, as shown in Fig. 24. This data comprises the date, the consecutive number, the classification number, and the amount.

Furthermore, the slip printer may be used to print upon what is known as a departmental total slip 509, illustrated in Fig. 28. This also has the date, the consecutive number, the classification number, the machine number, and the amount printed thereon, and it may be used when items sorted in the compartments are to be removed from the sorting rack at any time and dispatched to the department from which they came in the first place. In Fig. 28 it will be noted that there were 365 items which were sent back to the miscellaneous transit department, accompanied by a departmental total slip. This provides a check on the total amount of items sent back to that department.

Referring now particularly to Fig. 11, type wheels 521 are adapted to be set up to print the amounts and other data under control of the amount keys 76, the transaction keys 77, 78, and 79, and also the printing control keys 75, when desired, in the manner previously stated, by the use of the Kreider internal gear drive mechanism.

There are three hammers 522, 523, and 524 in this slip printing mechanism. The hammer 524 prints the date, the hammer 523 prints the consecutive number, and the hammer 522 prints the amounts, the classification number, and the machine number on the inserted deposit slit 1507, check 508, or departmental total slip 509, as the case may be.

In Fig. 11 the hammer 522 is shown. A description of this hammer and the mechanism for operating it will suffice for the two hammers 523 and 524, as the operating mechanisms for these hammers are all alike. The hammer 522 differs from the hammers 523 and 524 in that the hammer 522 has two supporting arms 525, whereas the hammers 523 and 524 are supported on a single arm 525, all of which arms are mounted on the previously-described rod 353. Connected to the arms 525 is an adjustable operating link 526 pivoted to a lever 527 loosely mounted on the rod 357. This lever 527 has a stud 528 adapted to be engaged by a link 529 pivoted to an arm 530 fast on the shaft 304. It will be recalled that this shaft 304 is given a clockwise movement and then a counter-clockwise movement for each adding operation and for each total-taking operation of the machine. When this occurs, and the link 529 is coupled to the stud 528, the lever 527 is rocked counter-clockwise to raise the hammer 522 to take an impression from the type wheels 521. The same is true of the hammers 523 and 524, they being operated by links 529 exactly like those shown in Fig. 11, when there is a slip in the machine—that is, a deposit slip 1507, a check 508, or a departmental total slip 509, such as those shown in Figs. 23, 24, and 28—and when the link 529 is coupled to the stud 528.

Secured to the cam shaft 202 is a pair of cams 531 and 532 cooperating with rollers 533 and 534 of a bell crank 535 connected by a link 536 to an arm 537 fast on a shaft 538, to which is also secured an arm 539 having a stud 540. Cooperating with the stud 540 is a lever 541 held in contact therewith by a spring 542. This lever 541 is connected by a link 543 to the previously-described link 529.

From the above-described mechanism, it can be seen that, during each operation of the shaft 202, the arm 537, the shaft 538, and the arm 539 are rocked first counter-clockwise and then clockwise to normal position. During the counter-clockwise movement thereof, the spring 542 causes the lever 541 to follow the stud 540, whereupon the link 543 rocks the link 529 counter-clockwise to couple it to the stud 528, so that, upon the forward and backward movement of the link 529, the lever 527 will be oscillated to operate the hammer 522 to make the proper impression upon the inserted slip.

If there is no departmental slip 509, check 508, or deposit slip 1507 in the machine, there is provided means to prevent operation of all three hammers 522, 523, and 524.

This mechanism comprises a feeling lever 550 pivoted on a stud 551 carried by the frame 62. This lever 550 is coupled to a lever 552 having a roller 553 cooperating with a cam 554 secured to the printer operating shaft 202. The lever 552 has a stud 555 engaged by an arm 556 secured to a shaft 557, which also has secured thereto a hook arm 558 adapted to cooperate with an extension 559 of the lever 541. There are three of these hook arms 558, one for each of the levers 541 associated with each of the hammers 522, 523, and 524.

The deposit slip, check, or departmental slip to be printed upon is placed in the guide chute 560 (Fig. 10), and, during the operation of the machine, when the cam 554 is rotated so that the high portion thereof is moved from beneath the roller 553, a spring 568 tends to rotate the lever 552 and the lever 550 clockwise. Due to the fact that there is a slip of some kind in the chute 560, such rotation of the levers 552 and 550 is prevented, and consequently there can be no movement of the lever 550, the shaft 557, and the hook arms 558.

However, when there is no deposit slip, check, or departmental slip in the machine and the cam 554 is operated, as above described, to remove the high portion thereof away from the roller 553, then the spring 568 can rock the levers 550 and 552 clockwise, whereupon the stud 555 rocks the arm 556, the shaft 557, and the hook arms 558 counter-clockwise to place the hook arms 558 in front of the extensions 559 on the levers 541, and therefore, when the arm 539 is rocked counter-clockwise by the cams 531 and 532, as above described, the levers 541 cannot follow under action of their springs 542, due to the fact that they are restrained by the hook arms 558, and consequently the links 529 cannot be coupled to the operating levers 527 for the hammers 522, 523, and 524, and therefore the movement of the links 529 backward and forward is merely an idle one and there will be no actuation of any of the hammers 522, 523, and 524.

As above stated, there is a means for printing the date upon an inserted deposit slip, an inserted check, or an inserted departmental total slip. The means for accomplishing this will be but briefly described, as it is substantially like other date mechanisms which are illustrated and described in the above-mentioned United States patents.

There are four date levers 561 (Figs. 1 and 20) for setting up the months, the days, and the years. Each lever 561 is connected to a disk 562 secured to an internal-external gear 563, driving a square shaft and pinions which in turn drive another external-internal gear to drive a pinion 564 to operate a further external-internal gear 565 secured to a driving gear 566, which is directly meshed with the date type wheel 567. This type of drive has been explained earlier herein, and no further description of the setting means for the date type wheels 567 is thought necessary herein.

There is, however, an interlocking mechanism to prevent the release of the machine unless the date type wheels 567 are properly set in one of their printing positions. In other words, a date type wheel 567 cannot be set so that at the printing line only a portion of one of the type faces of the date type wheel 567 would be positioned at the printing line.

Such interlocking mechanism comprises the following means: The disk 562 is provided with alining notches 570 cooperating with a stud 571 on a lever 572 pivoted on a rod 573. The stud 571 is held in the notch 570 by a spring 574.

The lever 572 engages the under side of a bail 575 pivoted on the rod 573. This bail 575 has an arm 576 connected by a link 577 to an arm 578 fast on a shaft 579 supported by the printer frame. The shaft 579 also has secured thereto an arm 580 connected by a link 581 to an arm 582 pivoted on a stud 583 supported by the machine side frame. This arm 582 cooperates with a flat stud 584 in the previously-described machine release lever 277.

From the above description it can be seen that when the levers 561 are moved to set the date, the studs 571 bob in and out over the notches 570, and if any lever 561 should be left between positions, the bail 575 and the arm 576 would be left rocked in a counter-clockwise position, thus raising the link 577 and rocking the shaft 579 clockwise, which, through the link 581, would rock the arm 582 to position it in front of the stud 584, thus preventing any movement of the lever 277, whereupon it would be impossible to release the machine. Therefore, in order that the machine could be released, it would be necessary to move the lever 561 into a positive printing position, wherein the stud 571 is located in one of the selected notches 570, in which position the arm 582 is out of the path of movement of the stud 584.

Consecutive number mechanism

In order to keep track of the number of operations of the machine, there is provided the usual consecutive number counter 585 of the well-known Veeder type. This counter is readable through an opening 586 (Fig. 1) in the cabinet 70. A bell crank 587 is pivoted on the countershaft 588 and carries the usual differentially timed pawl 589 for operating the wheels of the counter 585 to count one each time the machine is operated. This is accomplished by the following means:

Connected to the bell crank 587 is a lever 590 pivoted on a stud 591 supported by the printer frame 62. A spring 592 normally holds the parts in the positions shown in Fig. 10 and returns said parts to their normal positions, as will be hereinafter described. A link 593 connects the lever 590 to an arm 594 pivoted on a stud 595 carried by the frame 62. The arm 594 has a roller 596 cooperating with the previously-described cam 554. During an operation of the machine, the cam 554 rocks the arm 594 counter-clockwise, whereupon the lever 590 is rocked counter-clockwise to operate the bell crank 587 in a clockwise direction, whereby the pawl 589 advances the counter 585 one step of movement. The arm 594, the lever 590, and the link 593 are returned to their normal positions by the spring 592, which spring also holds the roller 596 in contact with the cam 554.

Sorting bins

A portion of the sorting bins used in connection with this machine is shown in Fig. 1. The two bins "18" and "19," as shown, are associated with the transaction keys. The bins 597 are provided with electrically-lighted indicators 598, which are controlled by the transaction keys through a cable device 599. In other words, when the "18" transaction key is depressed, the depression of the key operates a switch to light up the "18" indicator 598 of the bins 597, so that it calls attention of the operator to the fact that the check, or whatever is being distributed through the machine at that time, should be deposited in bin 597, numbered "18."

As the functions and operations of the machine were quite fully described at the beginning of this specification, and as the complete operations of all of the mechanism for performing these functions have been described throughout the specification, it is not thought necessary to give a description of the operation of the machine again.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a plurality of settable type members carried by the machine; impression means cooperable with the type members to make records on a record strip insertable to a printing position between the type members and the impression means, said impression means being carried by the machine and normally occupying a position remote from the type members to allow for the ready removal or insertion of the record strip; a carrier for said record strip by which said strip may be inserted to or removed from printing position between the type members and the impression means; means on the carrier for moving the impression means to a position adjacent the type members when the record strip has been inserted in printing position; actuating means for the impression means; and means selectively cooperable with the impression means in its moved position to enable the actuating means to operate the impression means to take an impression from the type members.

2. In a machine of the class described, the combination of a plurality of type members; impression means cooperating therewith to make printed records on an insertable record strip, said impression means normally occupying an inoperative position to allow for the ready removal and insertion of the record strip; actuating means for the impression means; means selectively operable to couple the impression means to its actuating means; an insertable record strip carrier; and means on the carrier, cooperating with the impression means, when the carrier is inserted, to move the impression means from its inoperative position into an operative position so that it may be coupled to its actuating means for operation thereby whenever the carrier has been inserted in the machine.

3. In a machine of the class described, the combination of a plurality of type members; impression means cooperating therewith to make printed records on an insertable record strip, said impression means normally occupying an inoperative position to allow for the ready removal and insertion of the record strip; an insertable record strip carrier; means on the carrier for guiding the record strip between the type members and the impression means in its inoperative position, as the carrier is inserted in the machine; means on the carrier, cooperating with the impression means, when the carrier is inserted, to move the impression means from its inoperative position to an operative position when the strip has been inserted between the type members and the impression means; actuating means for the impression means; and means selectively operable, when the impression means has been moved to its operative position, to couple the impression means to its actuating means, whereby the impression means can be selectively coupled to its actuating means for operation thereby whenever the carrier has caused the record strip to be inserted between the type members and the impression means.

4. In a machine of the class described, the combination of a record strip carrier which is readily removable from and insertable into the machine; impression means cooperable with said strip, said impression means being mounted in the machine and normally occupying an inoperative position to allow for the ready insertion and removal of the record strip; record strip feeding means carried by said carrier; actuating means for the impression means; actuating means for the feeding means; a coupling element for coupling the impression means actuating means to the impression means; a coupling element for coupling the feeding means actuating means to said feeding means; said carrier, when inserted in the machine, positioning the feeding means where it can be engaged by its coupling element and moving the impression means to an operative position where it can be engaged by its coupling element; a member to which the two coupling elements are connected and which is operable to move the coupling elements into engagement with the feeding means and the impression means; manipulative means; and means controlled by the manipulative means to control the operation of the member to selectively couple or uncouple the feeding means and the impression means and their respective actuating means.

5. In a machine of the class described, the combination of machine operating means; a plurality of insertable record strip carriers; recording means related to each carrier for making records on the record strip carried thereby; actuating means operated by the machine operating means for causing the operation of the various recording means; selecting means for selectively rendering the recording means for one or another of said record strips operable by the actuating means; means normally locking the machine operating means against operation; means jointly operated by the plurality of carriers, when they are inserted in the machine, for releasing said locking means whenever all of said carriers have been inserted in the machine; and disabling means carried by each carrier and selectively operable to render the actuating means ineffective to operate the recording means related to that carrier regardless of the operation of the selecting means, whereby the selective operation of the recording means related to various carriers can be disabled if the number of carriers required to be inserted in the machine to release the machine locking means exceeds the number of carriers desired to be selectable for recording operations.

6. In a machine of the class described, the combination of an insertable record strip carrier; feeding means for the record strip, said feeding means being supported by the carrier; actuating means for the feeding means; means selectively operable, when the carrier has been inserted in the machine, for coupling the actuating means to the feeding means to cause the selective feeding of the record strip; control means for controlling the selective operation of the coupling means; and disabling means carried by the carrier and settable to cooperate with the coupling means to prevent the coupling of the actuating means to the feeding means regardless of the operation of the control means.

7. In a machine of the class described, the combination of an insertable record strip carrier; impression means carried by the machine, said carrier supporting the record strip in cooperative relation with the impression means when the carrier is inserted in the machine; actuating means for the impression means; means selectively operable, when the carrier has been inserted in the machine, for coupling the actuating means to the impression means to cause impressions to be made on the strip; control means for controlling the selective operation of the coupling means; and disabling means carried by the carrier and settable to cooperate with the coupling means to prevent the coupling of the actuating means to the impression means regardless of the operation of the control means.

8. In a machine of the class described, the combination of a record strip carrier which is readily removable from and insertable into the machine; impression means cooperable with said strip, said impression means being mounted in the machine and normally occupying an inoperative position to allow for the ready insertion and removal of the record strip; record strip feeding means carried by said carrier; actuating means for the impression means; actuating means for the feeding means; a coupling element for coupling the impression means actuating means to the impression means; a coupling element for coupling the feeding means actuating means to said feeding means; said carrier, when inserted in the machine, positioning the feeding means where it can be engaged by its coupling element and moving the impression means to an operative position where it can be engaged by its coupling element; a member to which the two coupling elements are connected and which is operable to move the coupling elements into engagement with the feeding means and the impression means; manipulative means; means controlled by the manipulative means to control the operation of the member to selectively couple or uncouple the feeding means and the impression means and their respective actuating means; and means carried by the carrier and settable to engage the member and prevent the member from moving the coupling elements into engagement with the feeding means and impression means regardless of the control of the member by the manipulative means.

PASCAL SPURLINO.
KONRAD RAUCH.